(12) United States Patent  (10) Patent No.: US 7,830,576 B2
Nakahata  (45) Date of Patent: Nov. 9, 2010

(54) SCANNING OPTICAL APPARATUS AND METHOD, AND IMAGE FORMING APPARATUS

(75) Inventor: Hiroshi Nakahata, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 12/033,623

(22) Filed: Feb. 19, 2008

(65) Prior Publication Data

US 2008/0198435 A1   Aug. 21, 2008

(30) Foreign Application Priority Data

Feb. 19, 2007   (JP) .............................. 2007-038217

(51) Int. Cl.
G02B 26/08  (2006.01)
(52) U.S. Cl. .................................. 359/201.1
(58) Field of Classification Search ............. 359/201.1, 359/216.1–219.1; 250/234–236; 347/259–261; 358/474, 481
See application file for complete search history.

(56) References Cited

U.S. PATENT DOCUMENTS

| 7,072,087 B2 | 7/2006 | Nakahata | 359/204 |
| 2005/0285929 A1 | 12/2005 | Nakahata | 347/238 |
| 2006/0266937 A1 * | 11/2006 | Fukase | 250/234 |
| 2007/0053041 A1 | 3/2007 | Nakahata | 359/216 |

FOREIGN PATENT DOCUMENTS

| JP | 9-114162 | 5/1997 |
| JP | 10-213759 | 8/1998 |
| JP | 2001-264674 | 9/2001 |
| JP | 2005-156919 | 6/2005 |

* cited by examiner

*Primary Examiner*—Euncha P Cherry
(74) *Attorney, Agent, or Firm*—Fitzpatrick, Cella, Harper & Scinto

(57) ABSTRACT

A scanning optical apparatus includes a plurality of rotatable polygonal mirrors for scanningly deflecting laser beams; a plurality of optical members provided across optical paths of the beams deflected by the rotatable polygonal mirrors; vibration detecting means for detecting vibration of at least one of the optical members during driving of the rotatable polygonal mirrors; phase control means for controlling a phase relation between the rotatable polygonal mirrors on the basis of an output of the vibration detecting means.

9 Claims, 11 Drawing Sheets (A)

(B)

BEFORE ADJUSTMENT (a-1)

+

(a-2)

=

(a-3)

PHASE ADJUSTMENT →

AFTER ADJUSTMENT (b-1)

+

(b-2)

=

(b-3)

SCANNING OPTICAL APPARATUS AND METHOD, AND IMAGE FORMING APPARATUS

FIELD OF THE INVENTION AND RELATED ART

The present invention relates to an optical scanning apparatus used for an electrophotographic copying machine, a printer, a facsimile machine, etc., for example. It also relates to an image forming apparatus. In particular, it relates to a technology which reduces the vibration of an optical member attributable to a rotational polygon mirror of the optical scanning apparatus mounted in an image forming apparatus.

An example of an electrophotographic color image forming apparatus in accordance with the prior art, which is for printing a color image, is shown in FIGS. 8 and 9.

This example of color image forming apparatus is provided with four image forming portions (image formation units) P (PY, PM, PC, and PBk), each of which has an image forming means for forming an image on recording medium. Further, the image forming means of each of the image forming portions PY, PM, PC, and PBk has an electrophotographic photosensitive member 20 (20Y, 20M, 20C, or 20Bk) (which hereafter will be referred to as "photosensitive drum 20"), which is an image bearing member in the form of a drum.

The photosensitive drum 20 is made up of an electrically conductive member (drum), and a photosensitive layer coated on the peripheral surface of the electrically conductive member. It is uniformly charged by a charging device 21 (21Y, 21M, 21C, or 21Bk). Immediately after the charging of the photosensitive drum 20 (image bearing member), an electrostatic latent image is formed by scanning the peripheral surface of the photosensitive drum 20 with the beam of laser light emitted from an optical scanning apparatus 30.

The optical scanning apparatus 30 scans the peripheral surface of the photosensitive drum 20 with the beam of laser light, which it emits while modulating the beam based on the pictorial information sent from an unshown image reading apparatus, personal computer, or the like.

After the formation of the electrostatic latent image on the photosensitive drum 20 by the beam of laser light emitted from the optical scanning apparatus 30, the electrostatic latent image is developed into a visible image (which hereafter will be referred to as toner image) with the use of triboelectically charged toner stored in a developing apparatus 22 (22Y, 22M, 22C, or 22Bk).

The toner image on the photosensitive drum 20 is transferred onto an intermediary transfer belt 25, and then, is transferred onto a sheet of transfer medium S, which is supplied from a sheet feeder cassette 41 or a manual feeder tray 42. The toner remaining on the photosensitive drum 20 after the transfer is removed by a cleaning apparatus 24 (24Y, 24M, 23C, or 24Bk).

After the transfer of the toner image onto the sheet of transfer medium S, the toner image is fixed by a fixing apparatus 50. Then, the sheet of recording medium S is discharged into a delivery tray 43.

FIG. 9 is a schematic sectional view of the image forming portions P (PY, PM, PC, and PBk), and optical scanning apparatus 30 (which is made up of two optical scanning units 30A and 30B), which are shown in FIG. 8. The intermediary transfer belt 25, etc., are not shown in FIG. 9. The optical scanning units 30A and 30B in the drawings are placed in the same optical box, that is, a housing 31. Each of the optical scanning units 30A and 30B is provided with a rotational beam of light deflector 33 (33A or 33B). The rotational beam of light deflectors 33 (33A and 33B) have polygon mirrors 32aA and 32aB, and rotationally driving portions (electric motors) 32bs (32bA and 32bB), respectively. The polygon mirror 32a is the means for changing the direction in which a beam of light is deflected. The rotationally driving portion 32b is the means for rotating the polygon mirror 32a.

The optical scanning units 30A and 30B, that is, the left and right ones, are the same in shape. Thus, only one of them, which in this case is the optical scanning unit 30A (left one in FIG. 8), will be described.

The optical scanning apparatus 30 is structured so that two beams of laser light are projected onto the polygon mirror 32a from opposing sides, one for one, to expose the photosensitive drums 20Y and 20M.

The optical scanning unit 30A has the rotational beam of light deflector 33A (which hereafter will be referred to simply as rotational beam deflector) and four f-θ lenses 34a, 34b, 35a, and 35b. The polygon mirror 32aA deflects the beam of laser light, which is emitted, while being modulated based on the pictorial information, so that the beam of laser light is made to move in a manner to scan the peripheral surface of the photosensitive drum 20. The f-θ lens focuses the beam of laser light into a minutes spot on the peripheral surface of the photosensitive drum 20. The optical scanning unit 30A is also provided with mirrors 36a and 36b, which are the means for reflecting the beam of light in a preset direction, and glass dust shields 37 (37a and 37b) which protects the optical scanning unit 30A from dust. The optical scanning unit 30A forms an electrostatic latent image on the photosensitive drums 20Y and 20 M, with the beam of laser light it emits.

The optical scanning unit 30A structured as described above has the housing 31 (optical box), that is, a box to which the various components of the optical scanning unit 30A are attached. The interior of the optical box 31 is shielded from the outside, by a top lid which is provided with the gloss shields 37 (37a and 37b).

FIG. 9 shows only the contour of the optical box 31; it does not show how the various optical components of the optical scanning unit 30A are attached to the optical box 31.

Designing an optical scanning apparatus so that the number of optical scanning units 33 is smaller than the number of the photosensitive drums 20, as in the case of the optical scanning apparatus 30, makes it possible to reduce an image forming apparatus in size and/or cost.

However, reducing the optical scanning apparatus 30 in size created a problem. That is, with the optical scanning apparatus 30 reduced in size, the optical components, such as the f-θ lenses 34a and 35a, beam deflecting mirrors 36a and 36b, etc., have to be positioned closer to each other, making it more likely for the optical components to be affected by the vibrations from the motors or the like. As the internal optical components of the optical scanning apparatus 30 vibrate, the beam of light emitted from a light source (light emitting portion) is made to oscillate in the secondary direction of scan, resulting in the formation of a defective image, that is, an image suffering from the defect called "banding", "pitch error", or the like. Of the banding, the component corresponding to the rotational cycle of the rotational beam deflector 33A is the same in cycle as the positional deviation of the scanning beam of light attributable to the angle between the adjacent two lateral surfaces (reflective surfaces) of the polygon mirrors 32aA (which hereafter will be referred to as optical facet angle error). Therefore, in the case of an optical scanning apparatus, such as the optical scanning unit 30A, in order to increase its optical box, that is, the housing 31, such measures as using a substance higher in Young's modulus, as the material for the housing 31, and/or pasting a vibration controlling member to the beam deflecting mirrors 36a and 36b, are taken to deal with the vibration problems.

Japanese Laid-open Patent Application H09-114162 discloses the following method as the solution to the abovementioned vibration problem of an optical scanning apparatus which employs a single photosensitive drum 20, and a single rotational beam deflector 33 for exposing the single photosensitive drum 20, that is, a method for canceling the vibration mode of the motor of the rotational beam deflector 33 by placing the rotational beam deflector 33, and an electric motor, as a vibration absorbing device, on the locations which correspond to the antinodes, opposite in polarity, of secondary vibration mode of the optical box 31, one for one.

However, the technology disclosed in Japanese Laid-open Patent Application H09-114162 cannot be applied to a vibration mode other than the secondary vibration mode. Further, the locations to which the two motors are to be attached are determined by the secondary vibration mode.

However, in the case of an image forming apparatus which employs multiple image bearing members to form an image, and in which multiple rotational beam deflectors are placed in the same housing, as they are in the above described optical scanning apparatus 30, it is not always possible to place the rotational beam deflectors on the portions of the optical box, which correspond to the antinode portion of the vibration mode of the optical box, because of the following reason. That is, for the purpose of equalizing the multiple photosensitive drums in terms of the optical characteristics of the beam of light, the paths, which the beams of light travel to expose the photosensitive drums, are desired to be the same in shape. Therefore, the positioning of the rotational beam deflectors is roughly determined by such factors as the drum pitch, symmetricalness of the optical system, etc.

Even if it is possible to attach one of the rotational beam deflectors to the portion of the optical box, which corresponds to one of the antinode of the vibration mode of the optical box, it may be impossible to attached the other rotational beam deflector to the portion of the optical box, which corresponds to the other antinode, that is, the antinode opposite in polarity. Needless to say, it is possible to place the electric motor for absorbing the vibration inside the housing of an optical scanning apparatus. However, not only does the placement of the electric motor inside the housing add to the cost of the image forming apparatus, but also, it requires an additional space in the housing. Moreover, if the portions of the optical box, to which the two rotational beam deflectors for exposure were attached, are different in vibration mode, the above-mentioned vibration absorbing motors have to be individually controlled to absorb vibration to cancel the two different vibration modes. Thus, the optical scanning apparatus must be provided with two vibration absorbing motors.

Thus, Japanese Laid-open Patent Application H10-213759 discloses the following method as the solution to the above-described problem. That is, the housing to which two scanner motors are attached is provided with a vibration detecting means so that the two scanner motors can be controlled in rotational phase to prevent the housing from vibrating.

Further, Japanese Laid-open Patent Application 2005-156919 discloses an optical scanning apparatus structured so that its two scanner motors, that is, the rotational beam deflectors, can be controlled in rotational phase to make the two rotational beam deflectors opposite in terms of the direction of unbalance in terms of weight.

Generally, an optical facet angle error is attributable to the rotation of a rotational beam deflector. More specifically, the cause of an optical facet angle error is the combination of the deviation (error) in the angle of the reflective surface(s) of a polygon mirror attached to the motor (polygon motor driving means), and the positional deviation of the scanning beam of light, which is caused by the vibrations of the optical members, which are caused by the vibration of the rotational beam deflector (motor of deflector).

According to the studies and experiments made by the inventors of the present invention, in reality, the optical components are different in vibratory frequency, manner in which they are supported, etc. Therefore, it seldom occurs that all the optical components cause the scanning beams of light to deviate from their normal paths by vibrating at the same time. Further, it became evident from the studies and experiments that focusing lenses (f-θ lens or the like) and reflective members (beam deflecting mirror) were more sensitive to vibration, being therefore more likely to cause optical facet angle errors than the other components of a rotational beam deflector. It also became evident that focusing lenses, such as an f-θ lens and the like, which was solidly bonded to a specific portion, being therefore smaller in the amount of vibration, and therefore, the dominant factor responsible for the optical facet angle errors was the vibration of the reflective members (beam deflecting mirrors).

In other words, there was a problem which neither of the structural arrangements disclosed in Japanese Laid-open Patent Applications H10-213759 and 2005-156919 could solve: they cannot reduce the vibrations of optical members, such as focusing lens (f-θ lens and the like) and reflective members (beam deflecting mirrors), which are more sensitive to vibration, being therefore more likely to cause optical facet angle errors attributable to vibration.

SUMMARY OF THE INVENTION

Thus, the primary object of the present invention is to provide an optical scanning apparatus which uses multiple beam deflectors to deflect a beam of light so that the beam of light is reflected in a manner to scan an image bearing member, and which is significantly smaller in the amount by which an electrophotographic image forming apparatus is reduced in image quality by the vibrations of the optical components of an optical scanning apparatus than an electrophotographic image forming apparatus in accordance with the prior art.

According to an aspect of the present invention, there is provided a scanning optical apparatus comprising a plurality of rotatable polygonal mirrors for scanningly deflecting laser beams; a plurality of optical members provided across optical paths of the beams deflected by said rotatable polygonal mirrors; vibration detecting means for detecting vibration of at least one of said optical members during driving of said rotatable polygonal mirrors; phase control means for controlling a phase relation between said rotatable polygonal mirrors on the basis of an output of said vibration detecting means.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Figure 1:
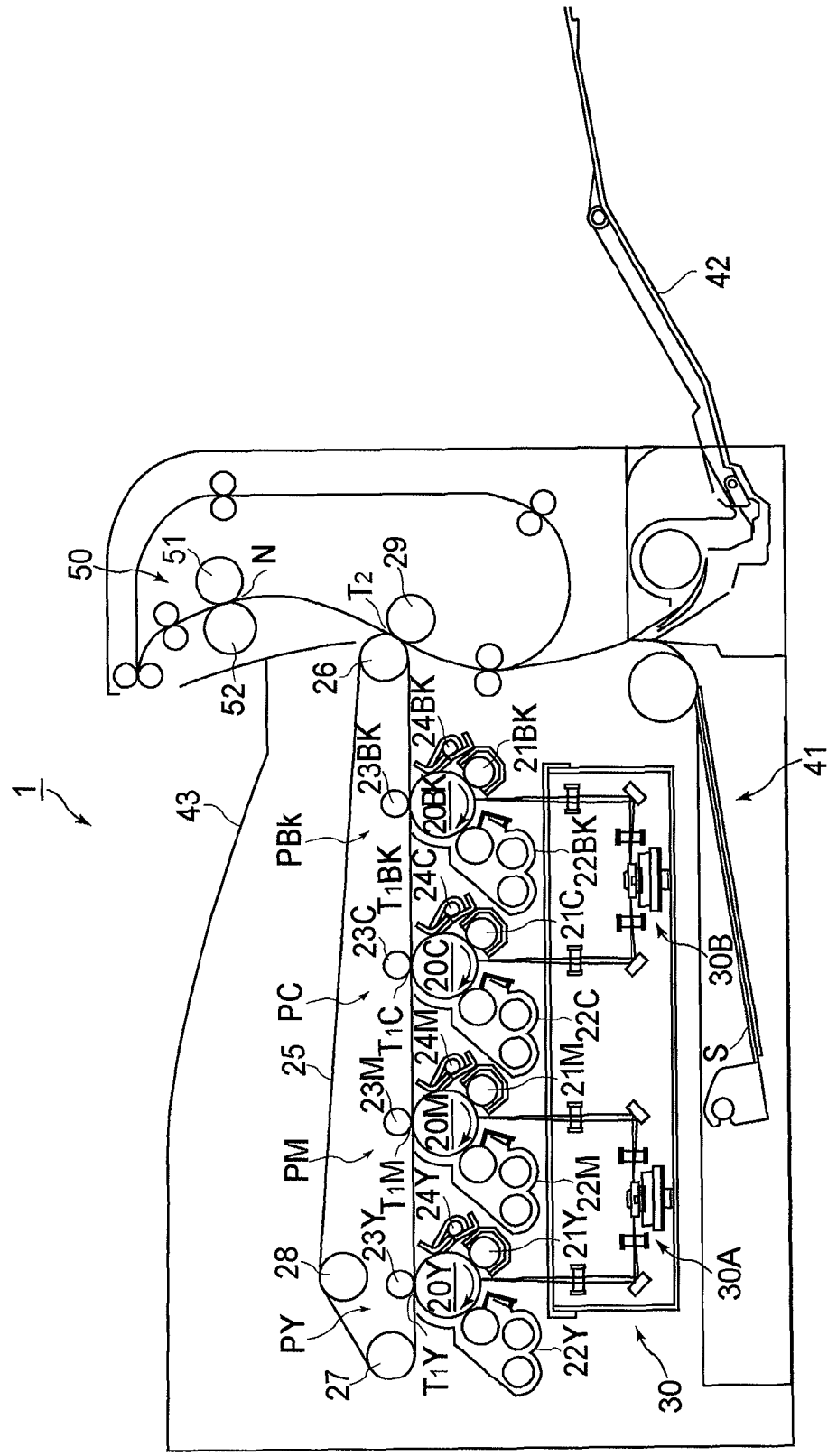
FIG. 1 is a schematic sectional view of the image forming apparatus in the first embodiment of the present invention, showing the structure of the apparatus.

First, the general concept of the present invention will be described.

As described above, the present invention can minimize the positional deviation of the beam of light emitted by an optical scanning apparatus, without being limited in terms of the portion of the optical box, to which the optical components of the optical scanning apparatus are positioned to absorb the vibration mode of the optical box, and also, without employing a component (or components), such as an electric motor, dedicated to the absorption of vibrations of the optical components.

The present invention employs a method for preventing (minimizing) the problem that an optical facet angle error is exacerbated by the vibrations of the optical members, such as a focusing lenses (f-θ lenses, etc.), beam deflecting mirrors, etc., which is caused by the vibrations which occur as a rotational beam deflector rotates. The present invention is distinctive in that instead of canceling the vibration mode of the optical box of an optical scanning apparatus, it uses the difference in rotation phase among the multiple rotational beam deflectors, in order to minimize the magnitude of the vibrations of the focusing mirrors and mirrors, in particular, which are more sensitive to vibrations, and therefore, are more likely to cause an optical facet angle error than the other components. In other words, the present invention does not alter the vibration mode.

The principle of the present invention is as follows:

Regarding an optical scanning apparatus made up of a single optical box, and multiple rotational beam deflectors which are solidly attached to the single optical box, it is not by a single rotational beam deflector that the optical members disposed in the paths (light paths) which the beam of light projected from the light source travels from the light source to the photosensitive member(s) to form a latent image on the photosensitive drum, are vibrated. In other words, the optical members are vibrated by two or more sources, that is, two or more rotational beam deflectors (motors of deflectors).

The amplitude and phase of the vibration caused by each rational beam deflector as a vibration source, are affected by the amount of the unbalance of the rotational beam deflector, and the angle of the rotational beam deflector. Therefore, the amount of difference in rotational phase between one of the rotational beam deflectors and another rotational beam deflector can be changed by temporarily accelerating and decelerating one of the rotational beam deflector relative to another. This principle can be used to reduce the vibrations of the optical members, which are caused by the vibrations attributable to the rotations of the multiple rotational beam deflectors.

In the case of the present invention, the amount of vibration, or optical facet angle error, of the focusing lenses or mirrors of an optical scanning apparatus, which are more sensitive to vibration, being therefore more likely to cause optical facet angle errors, than the other members of the optical scanning apparatus, is detected, and then, one of the rotational beam deflectors is changed in rotational phase relative to the rotational beam deflector preselected as the referential deflector, in order to reduce in amplitude the vibrations of the focusing lenses and/or mirrors to reduce the amount of optical facet angle error.

In a case where the focusing lens or mirror of an optical scanning apparatus are provided with a vibration sensor (vibration detecting means), all that is necessary to minimize the vibrations of the lens and mirror is to accelerate and decelerate the rotational beam deflectors, relative to others, to make the amount of difference in rotational phase (which hereafter may be referred to simply as "rotational phase difference") between one of the rotational beam deflectors and another match a preset value, each time the optical scanning apparatus is started up.

In a case where the focusing lenses or mirrors of an optical scanning apparatus are not provided with a vibration sensor, a referential value to which the rotational phase difference is to be set is stored in a memory in a factory or the like. This referential value corresponds to the length of delay between the combination of the BD cycle among the rotational beam deflectors, and the signal which each BD sensor detects. Therefore, the adjustment can be made with the use of the following method: each time the optical scanning apparatus is started up, the BD cycle between the adjacent two reflective surfaces of each rotational beam deflector is detected from the output signal of the BD sensor, and each rotational beam deflector is accelerated and decelerated to make the rotational phase difference match the preset value.

The present invention makes it possible to minimize the amount of the positional deviation of the beam of light to be projected upon the peripheral surface of a photosensitive drum, with the utilization of only the optical members necessary for image formation, that is, without employing a vibration causing source dedicated to the cancellation of the vibrations of the optical members, and also, without reducing in latitude the positioning of the optical members in the optical box.

Hereinafter, the preferred embodiments of the present invention will be described in detail with reference to the appended drawings.

Embodiment 1

General Structure of Image Forming Apparatus

FIG. 1 is a schematic sectional view of the electrophotographic full-color printer in the first embodiment of the present invention, that is, an example of image forming apparatus in accordance with the present invention. It shows the general structure of the printer.

Figure 8:
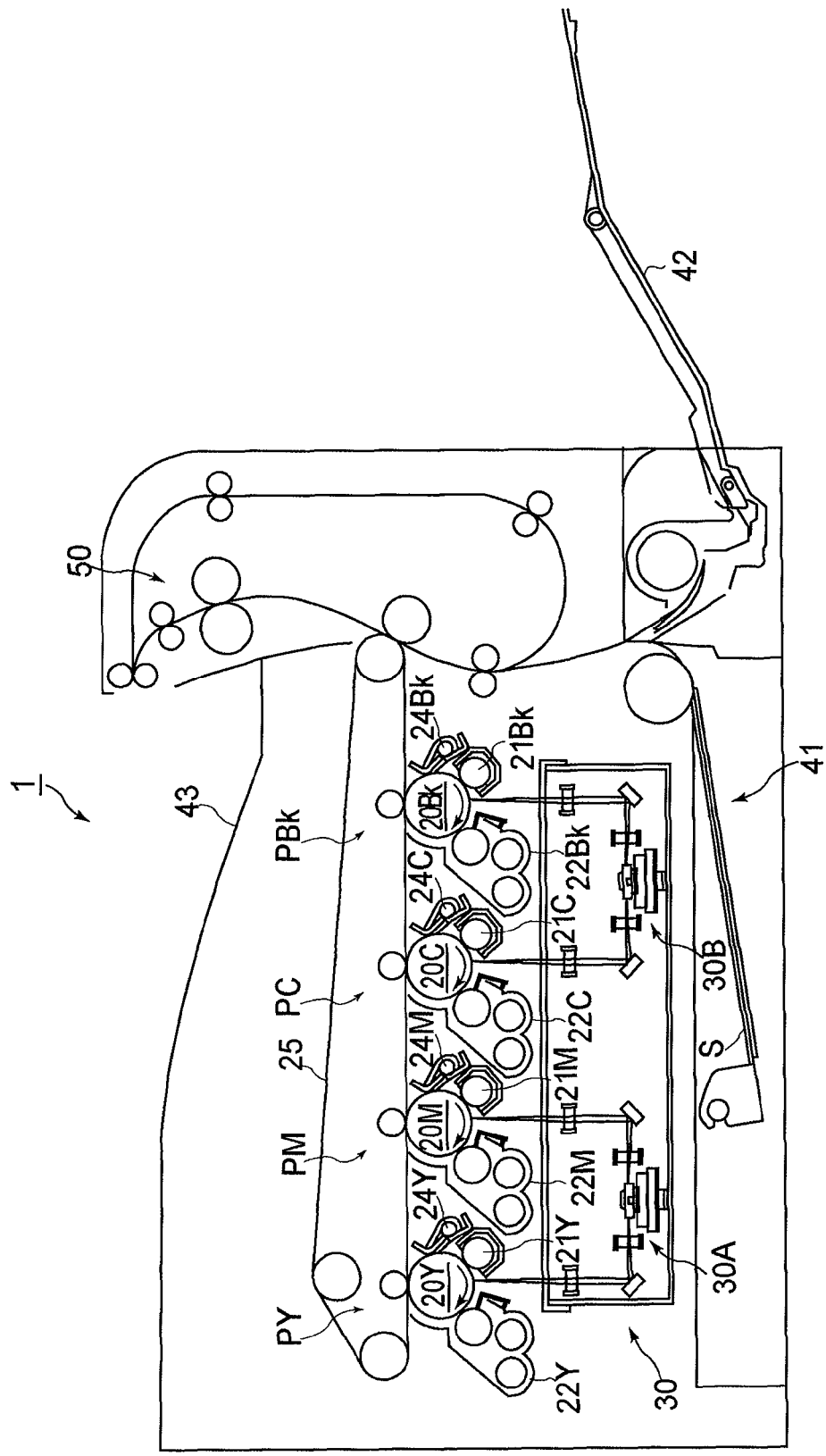
FIG. 8 is schematic sectional view of an example of electrophotographic image forming apparatus in accordance with the prior art.

The image forming apparatus 1 in this embodiment is the same in structure as the image forming apparatus in accordance with the prior art, which was described with reference to FIG. 8. That is, it has four image forming portions (image formation units) P (PY, PM, PC, and PBk). More specifically, it has an image forming portion PY which forms an image of yellow color, an image forming portion PM which forms an image of magenta color, an image forming portion PC which forms an image of cyan color, and an image forming portion PBk which forms an image of black color. The four image forming portions PY, PM, PC, and PBk are arranged in tandem with preset intervals.

Each of the image forming portions PY, PM, PC, and PBk has an image forming means for forming an image on recording medium. Further, the image forming means of each of the image forming portions PY, PM, PC, and PBk has an electrophotographic photosensitive member 20 (20Y, 20M, 20C, or 20Bk) (which hereafter will be referred to as "photosensitive drum"), which is an image bearing member in the form of a drum. Each image forming means also has a primary charging device 21 (21Y, 21M, 21C, or 21Bk) and a developing apparatus 22 (22Y, 22M, 22C, or 22Bk), which are disposed in the adjacencies of the peripheral surface of the photosensitive drum 20 (20Y, 20M, 20C, or 20Bk). Also disposed in the adjacencies of the peripheral surface of the photosensitive drum 20 are a transfer roller 23 (23Y, 23M, 23C, or 23Bk) and a drum cleaning apparatus 24 (24Y, 24M, 23C, and 23Bk). Further, the image forming apparatus 1 is provided with an optical scanning apparatus 30, which in this embodiment is a laser-based exposing apparatus. The optical scanning apparatus 30 is below the space between the primary charting device 21 and developing device 22 of each image forming portion.

In the developing apparatuses 22Y, 22M, 22C, and 22Bk, yellow, magenta, cyan, and black toners are stored, respectively.

Each of the photosensitive drums 20Y, 20M, 20C, and 20Bk is made up of an aluminum drum (as substrate), and a photoconductive layer formed on the peripheral surface of the aluminum drum, of organic photoconductor, which, normally, is negatively chargeable. It is rotationally driven by a driving apparatus (unshown) at a preset process speed, in the direction indicated by an arrow mark (clockwise direction in FIG. 1).

The primary charging devices 21Y, 21M, 21C, and 21Bk, which are the primary charging means, uniformly and negatively charge the peripheral surfaces of the photosensitive drums 20Y, 20M, 20C, and 20Bk, respectively, to a preset potential level by the charge bias applied to the primary charging devices 21Y, 21M, 21C, and 21Bk from a charge bias power source (unshown).

The developing apparatuses 22Y, 22M, 22C, and 22Bk, which are developing means, contain toner. They develop the electrostatic latent images formed on the peripheral surfaces of the photosensitive drums 20Y, 20M, 20C, and 20Bk, respectively, into toner images (visible images) by adhering the toners they contain, to the electrostatic latent images, one for one.

The transfer rollers 23Y, 23M, 23C, and 23Bk, which are the primary transferring means, are disposed so that they can be pressed upon the photosensitive drums 20Y, 20M, 20C, and 20Bk, with the presence of the intermediary transfer belt 25 between the transfer rollers 23Y, 23M, 23C, and 23Bk and the photosensitive drums 20Y, 20M, 20C, and 20Bk, in the primary transfer portions T1 (T1Y, T1M, T1C, and T1Bk), respectively.

The drum cleaning apparatuses 24Y, 24M, 24C, and 24Bk, which are the drum cleaning means, remove the primary transfer residual toners, that is, the toners remaining on the photosensitive drums 20Y, 20M, 20C, and 20Bk after the primary transfer, from the photosensitive drums 20Y, 20M, 20C, and 20Bk, respectively.

The intermediary transfer belt 25 is disposed on the top side of the photosensitive drums 20Y, 20M, 20C, and 20Bk. It is suspended and tensioned by a secondary transfer roller 26, and a pair of tension rollers 27 and 28. The secondary transfer roller 26 is disposed inside the loop which the intermediary transfer belt 25 forms. It is disposed so that it can be pressed against a secondary transfer roller 29, with the presence of the intermediary transfer belt 25 between the two secondary transfer rollers 26 and 29. The intermediary transfer belt 25 is formed of dielectric resin, such as polycarbonate, polyethylene-terephthalate, polyfluorovinylidene, etc.

On the downstream side of the secondary transfer portion T2 in terms of the direction in which the recording medium S is conveyed, a fixing apparatus 50 is disposed, which is the image heating means for thermally fixing the unfixed image (s) on the recording medium S.

The exposing apparatus 30 is made up of a light emitting means (laser), polygonal mirrors, focusing lenses, light beam deflecting mirrors, etc. The light emitting means (laser) emits a beam of laser light while modulating it with sequential digital electrical signals which reflect the pictorial information given to the image forming apparatus. The exposing apparatus 30 forms electrostatic latent images, which reflect the pictorial information, on the peripheral surfaces of the photosensitive drums 20Y, 20M, 20C, and 20Bk charged by the primary charging devices 21Y, 21M, 21C, and 21Bk, respectively.

Next, an image forming operation carried out by the image forming apparatus structured as described above will be described.

As an image formation start signal is issued, the photosensitive drums 20Y, 20M, 20C, and 20Bk of the image forming portions PY, PM, PC, and PBk are uniformly charged to the negative polarity by the 21Y, 21M, 21C, and 21Bk, respectively. Then, the exposing apparatus 30, which is an optical scanning apparatus, projects, from its light emitting element (laser), a beam of laser light while modulating the beam of laser light with pictorial signals which are obtained by separating the optical image of an intended image into optical monochromatic images of primary colors, and which are inputted from outside the image forming apparatus. The beam of laser light emitted from the exposing apparatus 30 is deflected by the polygon mirrors, focused by the focusing lenses, and directed by the beam deflecting mirrors, and forms an electrostatic latent image on each of the photosensitive drums 20Y, 20M, 20C, and 20Bk.

First, an electrostatic latent image is formed on the photosensitive drum 20Y in the image forming portion 1Y. Then, yellow toner is adhered to the electrostatic latent image, developing thereby the electrostatic image into a toner image (yellow toner image), by the developing apparatus 22Y to which development bias is being applied. The polarity of the development bias is the same as the polarity (negative) to which the photosensitive drum 20Y is charged. The yellow toner image is transferred (primary transfer) by the transfer roller 23Y onto the intermediary transfer belt 25 which is being driven, in the primary transfer portion T1Y. During the primary transfer, primary transfer bias (which is opposite in polarity to toner, being therefore positive) is applied to the transfer roller 23Y.

After the transfer of the yellow toner image, the intermediary transfer belt 25 is moved so that the portion of the intermediary transfer belt 25, which has the yellow toner image is moved toward the image forming portion PM, in which a magenta toner image is formed on the photosensitive drum 20M through the process similar to the process for forming the yellow toner image. Then, the magenta toner image is transferred in layers onto the yellow toner image on the intermediary transfer belt 25, in the primary transfer portion T1M.

The transfer residual toners remaining on the peripheral surfaces of the photosensitive drums 20Y and 20M are scraped away by the cleaning blades, or the like, with which the drum cleaning apparatuses 24Y and 24M are provided, respectively, and are recovered.

Thereafter, the cyan and black toner images formed on the peripheral surfaces of the photosensitive drums 20C and 20Bk of the image forming portions PC and PBk are sequentially transferred in layers onto the yellow and magenta toner images on the intermediary transfer belt 25, in the primary transfer portions T1C and T1Bk, respectively. As a result, a full-color toner image is effected on the intermediary transfer belt 25. The transfer residual toners remaining on the photosensitive drums 20C and 20Bk are scraped away by the cleaning blades or the like, with which the drum cleaning apparatuses 24C and 24Bk are provided, respectively, and are recovered.

Meanwhile, a sheet of recording medium S (transfer paper) as recording medium is fed from an automatic sheet feeder cassette 41 or manual feeder tray 42, into the main assembly of the image forming apparatus, and is conveyed through the recording medium conveyance path in the main assembly.

The transfer paper S is controlled in movement by a pair of registration rollers so that it will reach the secondary transfer portion T2 between the secondary transfer roller 26 (roller on inward side of intermediary transfer belt loop) and secondary transfer roller 29, at the same time as the leading edge of the full-color image on the intermediary transfer belt 25 will reach the secondary transfer portion T2. While the transfer paper S is conveyed through the secondary transfer portion T2, the four monochromatic toner images (which make up full-color toner image) are transferred onto the transfer paper S by the secondary transfer roller 29, to which the secondary transfer bias (which is opposite in polarity to toner, being therefore positive) is being applied.

After the transfer of the full-color toner image onto the transfer paper S, the transfer paper S is conveyed to the fixing apparatus 50 which is made up of first and second fixing members 51 and 52. Then, the transfer paper S is conveyed through the fixing apparatus 50, while the full-color image is thermally fixed to the surface of the transfer paper S by the heat and pressure applied to the transfer paper S and the images thereon, in the fixation nip N which the first and second fixing members 51 and 52 form between them. Thereafter, the transfer paper S is discharged by a pair of discharge rollers onto a delivery tray 43, which is part of the top wall of the housing of the image forming apparatus, ending the sequence for forming a single copy.

The secondary transfer residual toner, that is the residual toner remaining on the intermediary transfer belt 25 after the secondary transfer, and the like, are removed by a belt cleaning apparatus (unshown), and are recovered.

Described above is the image forming operation for forming an image on only one of the two surfaces of the transfer paper S (single-sided mode). Incidentally, the image forming apparatus in this embodiment is capable of forming an image on both surfaces of the transfer paper S (two-sided mode). However, this mode is well-known to the people in the field of image formation, and therefore, will not be descried here.

(Optical Scanning Apparatus)

Next, the optical scanning apparatus 30, which characterizes the present invention will be described. It is an exposing apparatus based on a laser.

Figure 9:
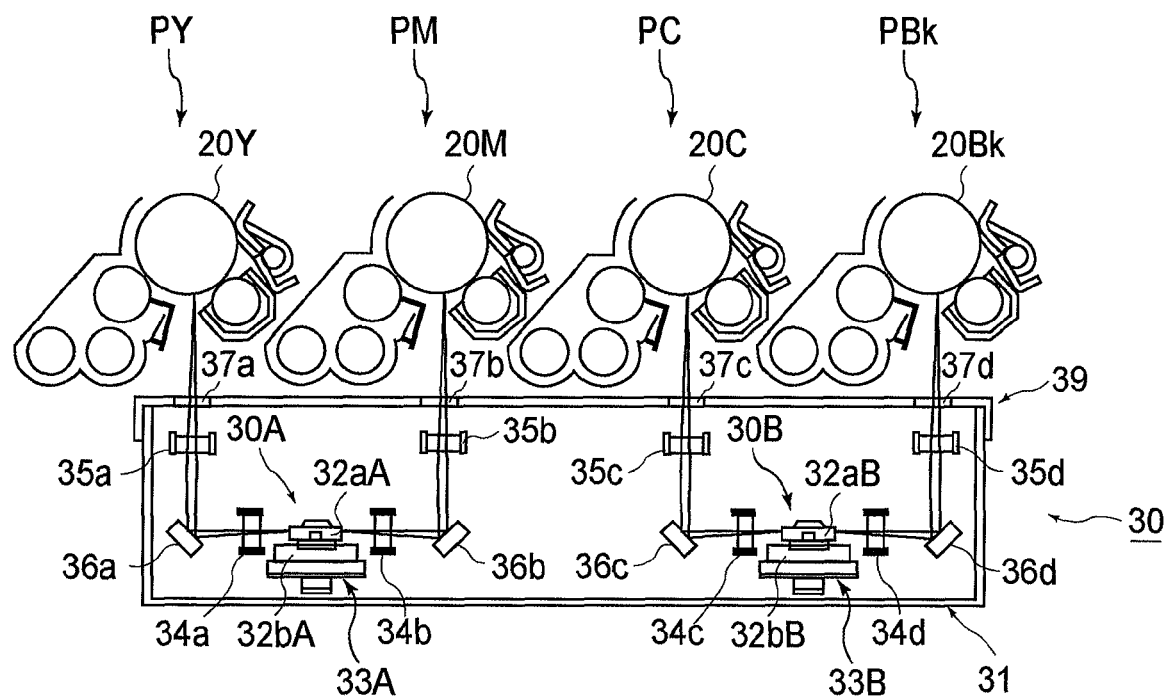
FIG. 9 is a schematic sectional view of the optical scanning apparatus of the electrophotographic image forming apparatus in accordance with the prior art, showing the structure of the optical scanning apparatus.

The optical scanning apparatus 30 in this embodiment is the same in general structure as the optical scanning apparatus 30 in accordance with the prior art, which was described with reference to FIGS. 8 and 9.

That is, the optical scanning apparatus 30 projects a beam of laser light upon the charged peripheral surface of the photosensitive drum 20 while modulating the beam according to the pictorial information sent from an unshown image reading apparatus, a personal computer, or the like. As a result, an electrostatic latent image is formed on the peripheral surface of the photosensitive drum 20 by the beam of laser light projected from the optical scanning apparatus 30.

Figure 2:
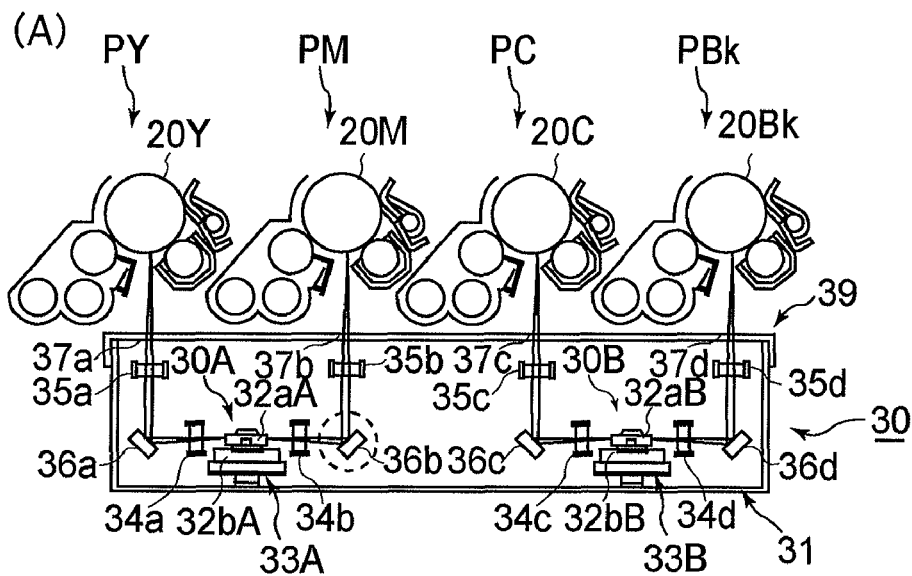
FIG. 2(A) is a schematic sectional view of the optical scanning apparatuses of the image forming apparatus in the first embodiment, and FIGS. 2(B(a-1))-2(B(b-3)) are graphs which show the waveforms of the vibrations of the beam deflecting members.
Figure 2:
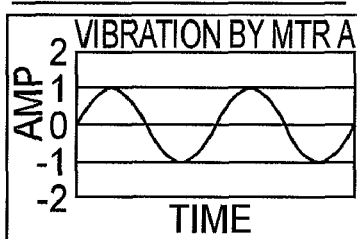
Figure 2:
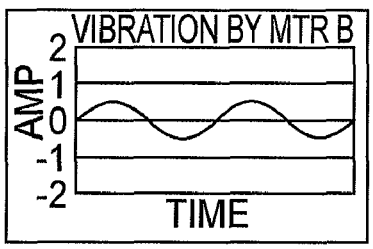
Figure 2:
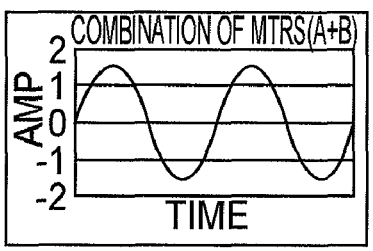
Figure 2:
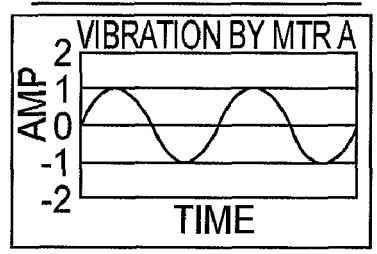
Figure 2:
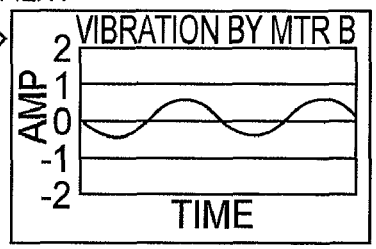
Figure 2:
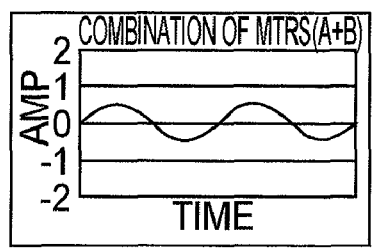

FIG. 2(A) is a schematic sectional view of the combination of the image forming portions P (PY, PM, PC, and PBk) and an optical scanning apparatus 30 (which is made up of two optical scanning units 30A and 30B) of the image forming apparatus 1. FIG. 2(A) does not show the intermediary transfer belt 25, etc. The optical scanning apparatus 30 in the drawing is made up of an optical box, that is, a housing 31, and a pair of rotational beam deflectors 33A and 33B mounted in the housing 31. The rotational beam deflectors 33A and 33B are the same in revolution. Each rotational beam deflector is made up of a polygon mirror 32a (32aA or 32aB) and a motor 32b (32bA or 32bB).

The left and right optical scanning units 30A and 30B are the same in shape.

The above-described beams of laser light are projected onto the opposite sides of each of the rotational beam deflectors 33A and 33B, one for one. After being projected upon the rotational beam deflector 33A, the beams of laser light expose different photosensitive drums 20, which in this embodiment are the photosensitive drums 20Y and 20M (and 20C and 20Bk), respectively.

In this embodiment, the optical scanning apparatus 30 is also provided with focusing lenses (f-θ lenses), beam deflecting member (light directing mirror), etc., which are disposed in the portion of each of the light beam paths, which is between the rotational beam deflector and corresponding photosensitive drum.

That is, the optical scanning unit 30A is provided with: the rotational beam deflector 33A, by which the beam of laser light emitted while being modulated based on the pictorial information is oscillated; and the f-θ lenses 34a, 35a, 34b, and 35b, which focus the beam of laser light into a minute spot on the peripheral surface of the photosensitive drum 20 while the beam is oscillated in manner to scan the peripheral surface of the photosensitive drum 20. Further, the optical scanning unit 30A is provided with multiple beam deflecting mirrors 36a and 36b, which deflect the beam of light in the preset direction. It forms an electrostatic latent image on the peripheral surface of the photosensitive drums 20Y and 20M with the beam of laser light.

Similarly, the optical scanning unit 30B is provided with: the rotational beam deflector 33B, by which the beam of laser light emitted while being modulated based on the pictorial information is oscillated; and the f-θ lenses 34c, 35d, 34c, and 35d, which focus the beam of laser light into a minute spot on the peripheral surface of the photosensitive drum 20 while the beam is oscillated in manner to scan the peripheral surface of the photosensitive drum 20. Further, the optical scanning unit 30B is provided with multiple beam deflecting mirrors 36c and 36d, which deflect the beam of light in the preset direction. It forms an electrostatic latent image on the peripheral surface of the photosensitive drums 20C and 20Bk with the beam of laser light.

The optical scanning apparatus 30 structured as described above has the optical box 31, that is, the housing to which the various components of the optical scanning apparatus 30 are attached. The interior of the optical box 31 is shielded from the outside, by a top lid for sealing the optical box 31. The top lid is provided with openings for exposing the photosensitive drums 20. The openings are fitted with transparent glasses 37 (37Y, 37M, 37C, and 37Bk) for protecting the interior of the optical scanning apparatus 30 from dust while allowing the beam of laser light to transmit through the openings.

The drawings show only the contour of the optical box 31; it does not show how and where the various optical components of the optical scanning apparatus 30 are attached to the optical box 31.

In the case of an optical scanning apparatus such as the optical scanning apparatus 30 in this embodiment, multiple rotational beam deflectors (two rotational beam deflectors 33A and 33B in this embodiment) are attached to the same optical box 31. Therefore, the vibrations of the rotational beam deflectors 30A and 33B are likely to transmit to the various optical components through the optical box 31.

Further, the optical facet angle error which is generally caused by the rotation of the rotational beam deflectors 33A and 33B is a combination of the following two components. That is, one is the deviation in angle of the reflective surfaces of the polygon mirrors 32aA and 32aB attached to the motors 32bA and 32bB of the rotational beam deflectors 33A and 33B, respectively, and the other is the positional deviation of the beam of laser light, which is caused by the vibration of the optical components attributable to the vibrations of the rotational beam deflectors 33A and 33B.

Regarding the abovementioned vibration components, in reality, the optical components of the optical scanning apparatus 30 are different in vibratory frequency, manner in which they are supported, etc. Therefore, it seldom occurs that all the optical components cause the scanning beams of light to deviate from their normal paths by vibrating at the same time.

In the case of the structural arrangement for the optical scanning apparatus 30 in this embodiment, the f-θ lenses 34a, 35a, 34b, and 35b are firmly bonded to specific locations of the optical box 31, being therefore very small in the amount of vibrations. Thus, the components which dominantly affect the amount of optical facet angle error are the vibrations of the beam deflecting mirrors 36a, 36b, 36c, and 36d in the drawings.

FIG. 2(B) shows the waveform of the vibrations of the beam deflecting mirror 36b of the optical scanning unit 30A in FIG. 2(A).

The graphs on the left side in FIG. 2(B) represent the data regarding the waveform of the vibration of the beam deflecting mirror 36b before the rotational phase difference adjustment, and the graphs on the right side in FIG. 2(B) represent the data regarding the waveform of the vibrations of the beam deflecting mirror 36b after the rotational phase difference adjustment. The graphs (a-1) and (b-1), that is, the top two graphs represent the vibrations which the beam deflecting mirror 36b receives from the rotational beam deflector 33A (which hereafter will be referred to as deflector A), and the graphs (a-2) and (b-2), that is, the middle two graphs represent the vibrations which the rotational beam deflector B (which hereafter will be referred to as deflector B). In reality, therefore, it is to the combination of the vibrations from the deflector A and the vibrations from the deflector B, which is represented by the graphs (a-3) and (b-3), that the mirror 36b is subjected.

The principle for reducing the amount of vibrations which the mirror 36b receives is shown by FIGS. 3(A) and 3(B), which are schematic sectional drawings of the optical scanning units 30A and 30, respectively, at a plane parallel to the axial line of the photosensitive drum 20.

Referring to FIG. 2(B), immediately after the starting of the optical scanning apparatus 30, the deflectors A and B are the same in the revolution. Therefore, as long as they are kept constant in the number of revolutions, they remain the same in their relationship in terms of rotational phase as immediately after they were started.

However, if only the deflector B is accelerated and decelerated while being rotated, it becomes advanced in rotational phase than the deflector A. In other words, as the deflector B is temporarily accelerated and decelerated, the vibrations to which the mirror 36b is subjected changes in phase as shown by FIG. 3(C). That is, the vibration to which the mirror 36b is subjected can be changed in phase by temporarily accelerating and decelerating the deflector B. Needless to say, this operation for accelerating and decelerating the deflector B is not to be carried out while an image is actually being formed; it is to be carried out in the period between immediately after the startup of the optical scanning apparatus 30 and immediate before the starting of the formation of an image.

In other words, the above-described principle can be used to minimize the amount of optical facet angle error. That is, the vibrations to which the mirror 36b is subjected, that is, the combination of the vibrations attributable to the deflector A and the vibrations attributable to deflector B, can be changed, that is, minimized in amplitude, as shown by the graphs on the right side of FIG. 2(B), that is, the graphs (b-1), (b-2), and (b-3), by changing the deflector B in rotational phase.

In the case of an image forming apparatus, such as the one disclosed in the abovementioned Japanese Laid-open Patent Application H10-213759, which employs multiple rotational beam deflectors 33, a so-called phase control has been used as the method for keeping the beam of laser light as accurate as possible in its position (writing timing), that is, the method for minimizing the beam of laser light in positional deviation, to minimize the color deviation in terms of the secondary scanning direction.

The phase control is most effective where it is applied to an image forming apparatus having the same number of photosensitive drums and rotational beam deflectors. It is a technology for controlling the timing with which each of the rotational beam deflectors, different in the primary color to which it is associated, starts writing, so that the scanning lines for multiple colors, one for one, properly align. Therefore, in a case where the vibration reducing method in accordance with the present invention is applied to an image forming apparatus, such as the one described above, which has the same number of photosensitive drums and rotational beam deflectors, the above described phase control cannot be applied, and therefore, it is possible that the results will be slight worse than those obtainable by the above described phase control.

However, in a case where an optical scanning apparatus structured to scan multiple photosensitive drums with the same (single) polygon mirror is used as in this embodiment, only the timing with which the beam of light is deflected by each reflective surface can be adjusted. Therefore, it is impossible to use a highly precise phase controlling method, such as the above-described one. Thus, in principle, the color deviation adjustment resolution in terms of the secondary scan direction is one picture element.

On the other hand, in a case where the vibration reducing (preventing) method proposed by the present invention is employed, a beam of light can be deflected with the use of the adjacent two reflective surfaces in a manner to scan the peripheral surface of a photosensitive drum. Therefore, after the rotational phase difference is adjusted to reduce the vibration, the amount of color deviation in the secondary scan direction which is attributable to the present invention is between 0-1 picture element. Therefore, in the case where the present invention is applied to an image forming apparatus, such as the one in this embodiment, the above described adjustment resolution is usually a single picture element, and therefore, it does not occur that the usage of the technology in accordance with the present invention exacerbate the color deviation.

Further, also in a case where the present invention is applied to an image forming apparatus which has the same number of photosensitive drums and rotational beam deflectors, the amount of color deviation attributable to the application of the present invention is between 0-1 picture element as described above. Therefore, it is possible to keep an image forming apparatus at a higher level of image quality than an optical scanning apparatus which scan multiple photosensitive drum all at once. In other words, in practical terms, it does not create any problem.

Next, regarding the control of the rotational beam deflectors, the optical scanning apparatus is designed so that each rotational beam deflector can be independently started or stopped from the other rotational beam deflectors. Therefore, each time the optical scanning apparatus is started, the multiple rotational beam deflectors of the scanning apparatus are different in rotational phase. Thus, the adjustment for realizing a preset relationship in rotational phase among the multiple rotational beam deflectors must be carried out each time the optical scanning apparatus is started.

Figure 4:
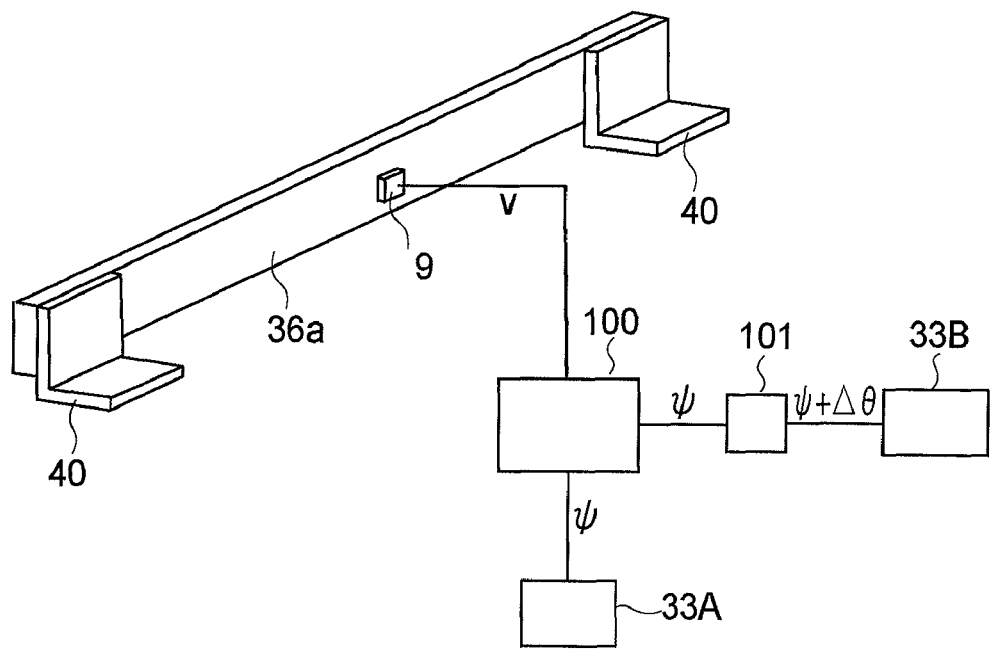
FIG. 4 is a schematic drawing which describes how and where the vibration sensor is attached in the first embodiment of the present invention.

FIG. 4 is a schematic drawing which shows the positioning of an acceleration sensor 9 (vibration sensor) as the means for detecting the amount of the vibration of the mirror 36b. The mirror 36b is solidly attached to the housing 31 of the optical scanning apparatus 30 with the use of a pair of supporting members, and fasting members, such as screws. The method for attaching the mirror 36b does not need to be limited to the above-described one.

In a case where the optical scanning apparatus is improved in terms of optical facet angle error, with the use of the vibration sensor 9 as in this embodiment, where the vibration sensor 9 is attached has only to be where the vibrations attributable to the rotation of the rotational beam deflectors 33A and 33B are detectable by the vibration sensor 9. That is, it may be anywhere except for the point which corresponds to the node of the vibration. It is preferred that the vibration sensor 9 is attached to where the vibration is largest in amplitude, being therefore easiest to detect, that is, the antinode of the vibration. In this embodiment, the vibration sensor 9 is attached to the center portion of the mirror 36b, which corresponds to the antinode of the vibration of the mirror 36b.

In this embodiment, the vibration sensor 9 is attached to the beam deflecting mirror 36b, that is, one of the reflective members located in the portion of the beam path, which is between the rotational beam deflector A, which serves as the referential deflector, and the photosensitive drum 20M. In this case, the other rotational beam deflector, that is, the rotational beam deflector B, is changed in steps in the rotational phase by the controlling means so that the vibrations to which the mirror 36b is subject becomes smaller in amplitude, until it becomes smallest. Next, this method of control will be described.

Figure 3:
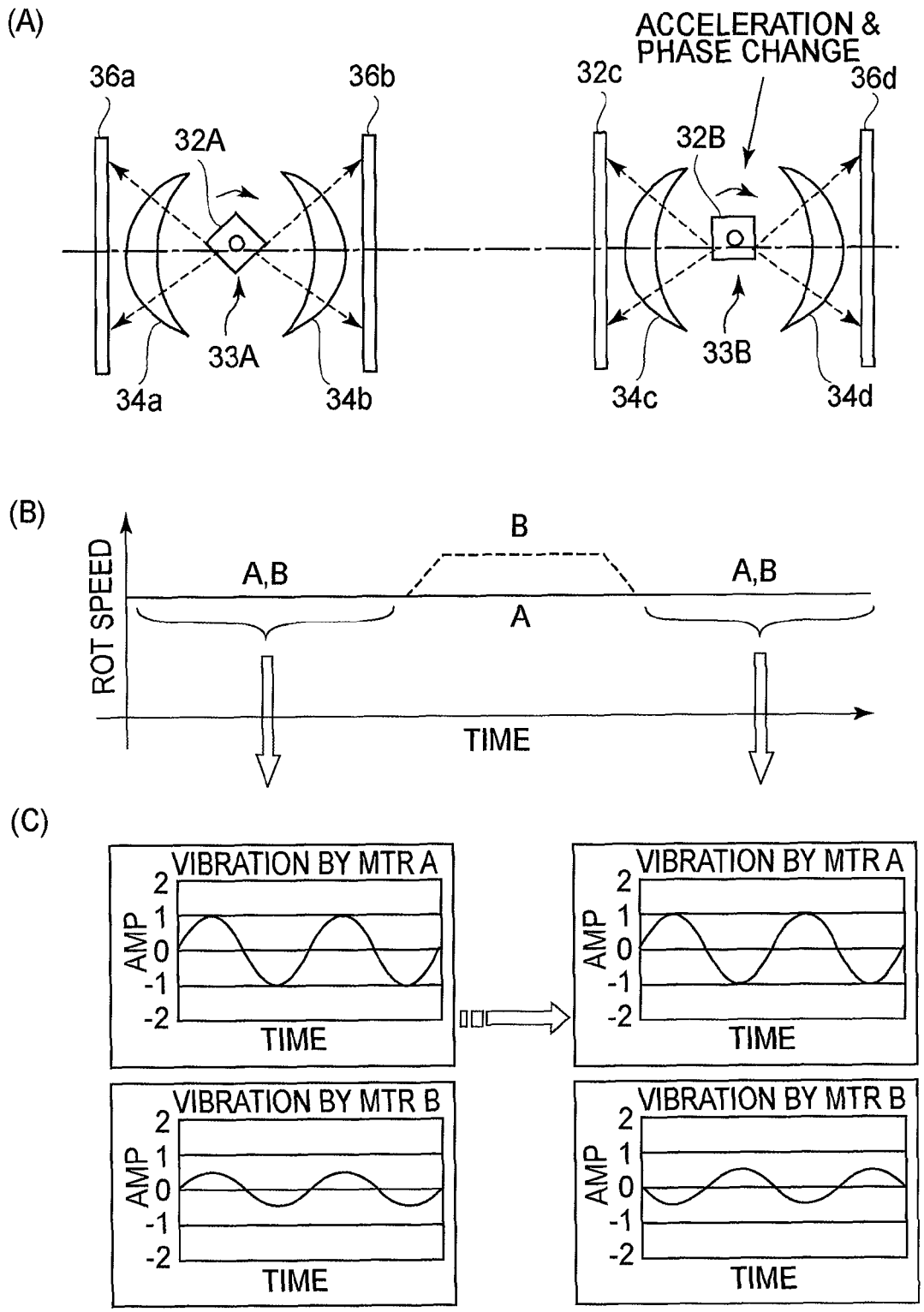
FIG. 3 is a schematic drawing which describes the principle of the vibration reduction in the first embodiment of the present invention.
Figure 10:
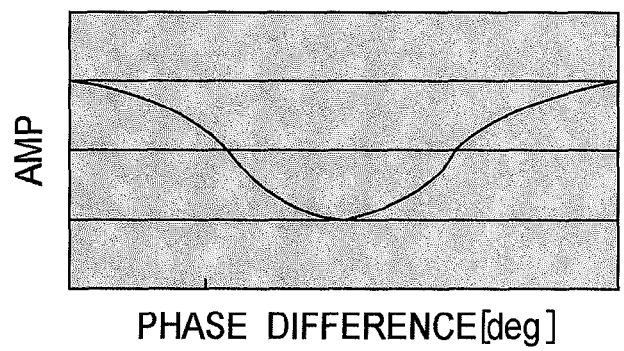
FIG. 10 shows behavior of the amplitude of the mirror.
Figure 11:
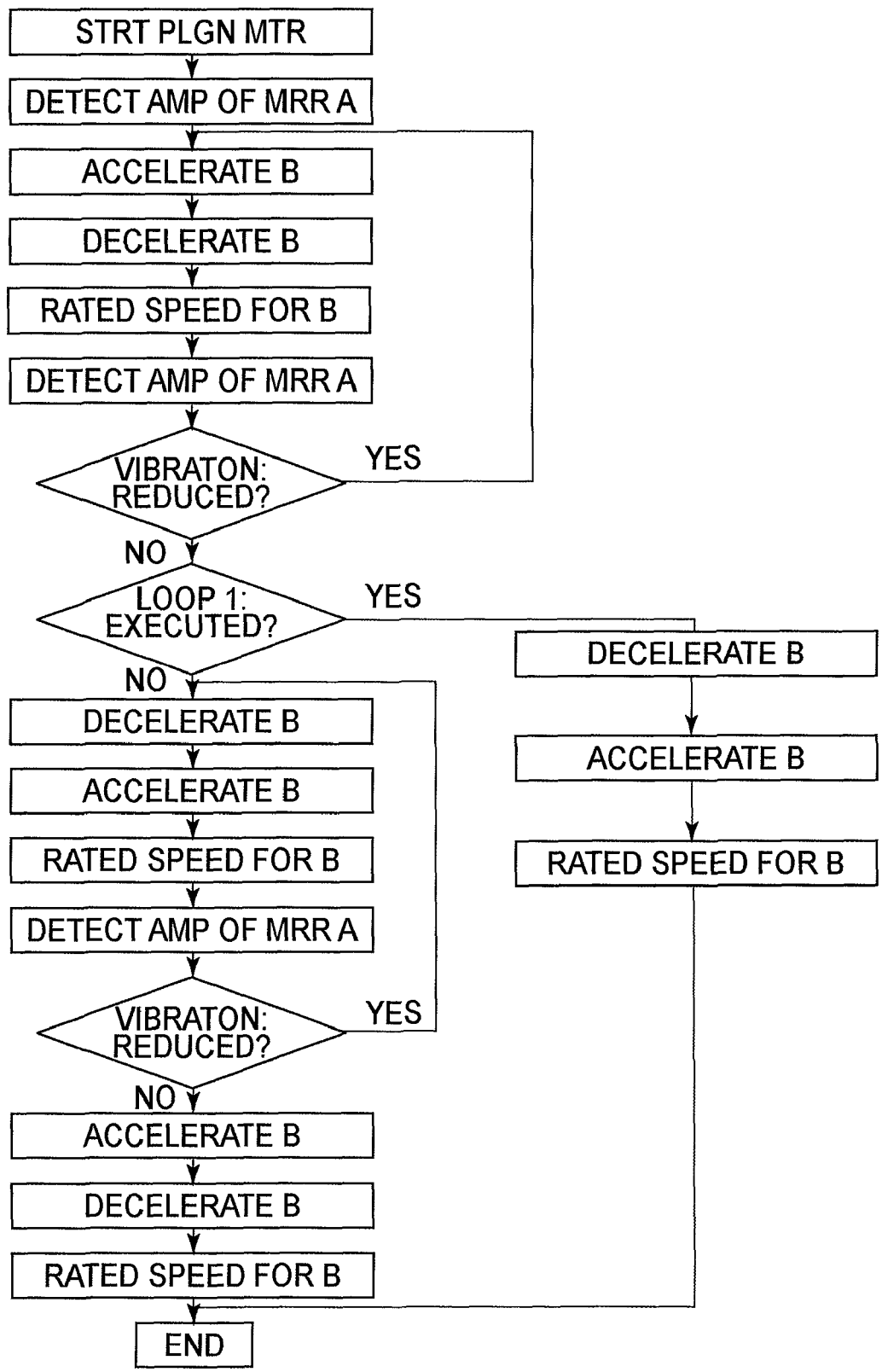
FIG. 11 is a flowchart of the operations for suppressing the amplitude of the mirror.

As described with reference to FIG. 3, the amount of difference in rotational phase between two rotational beam deflectors can be changed by temporarily accelerating and decelerating one of the rotational beam deflectors. The change in the amplitude of the vibration to which the mirrors are subjected has the characteristic that it is smallest when the amount of difference in rotational phase between the two rotational beam deflectors has a specific value as shown in FIG. 10. In the case of an optical scanning apparatus, the components of which are symmetrically arranged, it is generally where the amount of difference in rotational phase between the two rotational beam deflectors is 180 degrees that the amplitude of the vibration to which the mirror 36b is subjected is smallest. Further, in a case where the two rotational beam deflectors are equal in vibratory force, the amplitude is zero. Therefore, the direction in which one of the rotational beam deflectors is to be accelerated and decelerated can be determined by finding out whether the vibrations has increased or decreased in amplitude when one of the rotational beam deflectors is changed in rotational phase. Thus, the flowchart of the operation for reducing the vibration in amplitude by temporarily accelerating and decelerating the rotational beam deflector B is shown in FIG. 11. This flowchart is for reducing in amplitude the vibrations of the mirror 36b by controlling the rotational beam deflector B. First, as soon as the rotational beam deflector B reaches its normal speed, the amplitude of the vibration of the mirror 36b is detected. Then, the rotational beam deflector B is temporarily accelerated and decelerated to check whether the vibration increased or decreased in amplitude. If it is confirmed that the vibration has decreased in amplitude, it is evident that the minimum amount of vibration is achievable by shifting the rotational phase of the rotational beam deflector B in the direction in which the rotational beam deflector B was decelerated. Therefore, the above-described control is to be repeated until the vibration becomes smallest in amplitude. On the other hand, if the vibration became worse, that is, increased in amplitude, it is evident that the minimum amount of vibration is achievable by shifting the rotational phase of the rotational beam deflector B in the direction in which the rotational beam deflector B was accelerated. The last step in this operation is to slightly shift the rotational phase of the deflector B in the direction opposite to the direction in which the rotational phase of the deflector B was shifted to minimize in amplitude the vibration, after the step in which the vibration worsens.

To described concisely, referring to FIG. 4, the rotational phase controlling portion 100 of the rotational beam deflector B, which is a controlling means, delays a referential signal φ for the rotational phase of the deflector B by a preset angle θ by a delay circuit 101, in response to a voltage signal v outputted from the sensor 9 (acceleration pickup). Thus, the deflector B becomes different in rotational phase from the deflector A by the preset angle θ. This control for changing the deflector B in rotational phase relative to the deflector A is continued until the vibration of the mirror 36*b* becomes minimum in amplitude.

In this embodiment, the image forming apparatus which uses multiple (two) rotational beam deflectors to form an image is structured to control the difference in rotational phase between the two rotational beam deflectors in order to minimize in amplitude the vibration of the reflective members. Therefore, the image forming apparatus in this embodiment is superior in terms of optical facet angle error, being therefore in image quality, to an image forming apparatus in accordance with the prior art.

Further, the structural arrangement for the optical scanning apparatus in this embodiment can minimize the positional deviation of the beam of light projected from the optical scanning apparatus, without employing components, such as an electric motor, dedicated to the cancellation of the vibration mode of the optical box, making it possible to for an electrophotographic image forming apparatus to form an image higher in quality than an image formable by an electrophotographic image forming apparatus in accordance with the prior art. Moreover, it does not limit the portions of the optical box, to which the rotational beam deflectors are to be attached to cancel the vibrational mode of the optical box.

In the above, the first embodiment was described assuming that what vibrated were the beam deflecting mirrors, that is, the reflective member provided for guiding (directing) a beam of light toward the peripheral surface of the photosensitive drum. However, the present invention is also applicable to electrophotographic image forming apparatuses in optical members other than the reflective members, for example, focusing lenses (f-θ lenses 34 and 35), which are sensitive to vibrations, and therefore, are more likely to cause optical facet angle error than the other components. The results of such applications are the same as those obtained by the image forming apparatus in this embodiment.

Embodiment 2

Next, the second embodiment of the present invention will be described. Also in this embodiment, an apparatus to which the present invention was applied is an electrophotographic image forming apparatus, such as the one in the first embodiment. Therefore, the image forming apparatus in this embodiment will not be described, assuming that the description of the image forming apparatus in the first embodiment suffices.

In the first embodiment, the vibration sensor 9, which was attached to the reflective members 36 (or focusing lenses 34 and 35), was used to control the rotational beam deflectors in rotational phase. In this embodiment, however, the optical facet angle error is prevented without employing the vibration sensor 9.

Next, a method for preventing the optical facet angle error without vibration sensor 9 will be described.

Figure 5:
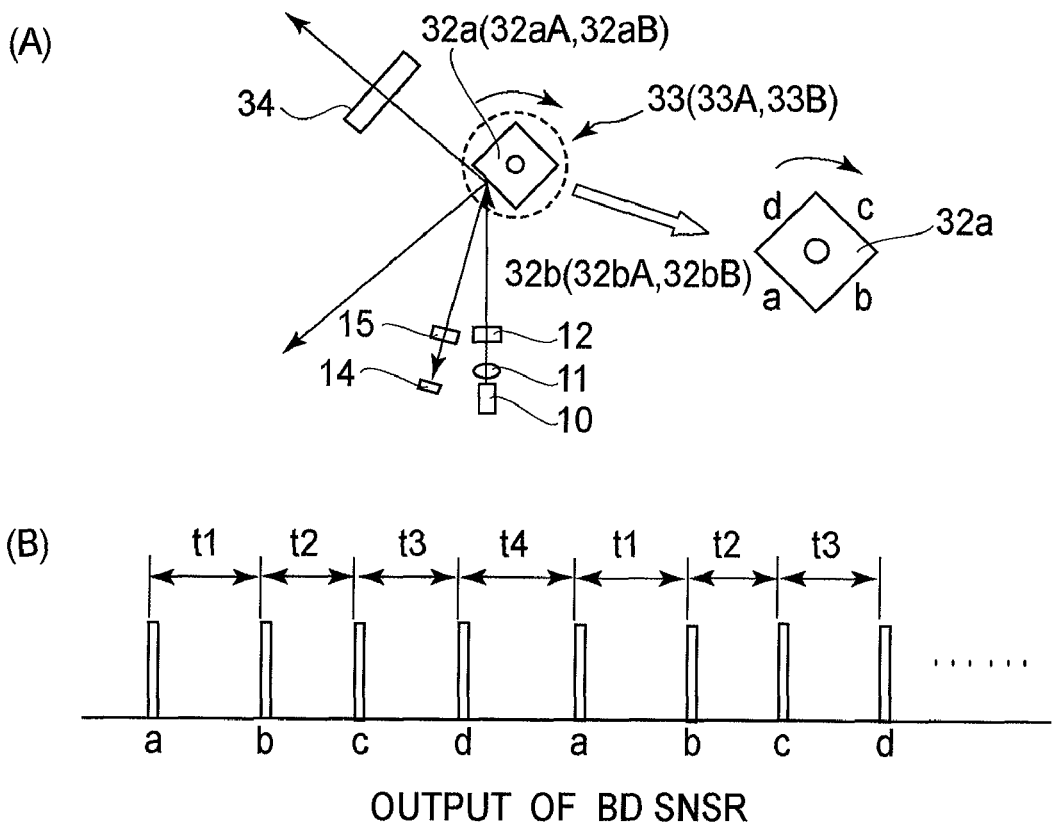
FIG. 5 is a schematic drawing which describes the general positioning of the optical components of the optical scanning apparatus, and the waveform of the output of the vibration sensor, in another embodiment of the present invention.

FIG. 5(A) is a schematic drawing which roughly shows the positioning of the optical components, in the adjacencies of the rotational beam deflectors 33 (33A and 33B), and FIG. 5(B) is a schematic drawing of the waveform of the output of the BD sensor.

The optical scanning apparatus 30 in this embodiment is provided with a light emitting portion 10 (light source), which is located in the adjacencies of the rotational beam deflector. It is also provided with: a collimator lens 11, which is for converting the beam of light projected from the light emitting portion 10, into a beam of parallel light; and a cylindrical lens 12, which is for linearly focusing the collimated beam of light, onto the polygon mirror 32*a* (32*a*A or 32*a*B). As described above, to the rotational beam deflector 33, the polygon mirror 32*a* (32*a*A, 32*a*B) is attached, which is for deflecting the beam of light projected thereupon, so that the beam of light moves in a manner to scan the peripheral surface of the photosensitive drum. Further, the optical scanning apparatus 30 is provided with a BD sensor 14 and an anamorphic lens 15. The BD sensor 14 is for generating the referential signal which shows the point at which writing is started for each line. The anamorphic lens 15 is for focusing the beam of light projected thereupon from the polygon mirror 32*a*, onto the BD sensor 14 so that the beam of light enters the BD sensor 14.

Generally, the cross-section of the polygon mirror 32*a* is in the form of a regular polygon. In reality, however, because of the errors which occur in the production of the polygon mirror 32*a*, the angle between the adjacent two lateral (reflective) surfaces of the polygon mirror 32*a* is slightly different from an ideal angle. In other words, the apexes of the polygon mirrors 32*a* are different in angle. For example, if the polygon mirror 32*a* is square in cross-section, having four lateral surfaces a, b, c, and d, as shown in FIG. 5(A), the ideal angle of each apex of the polygon mirror 32*a* is 90 degrees. However, the four apexes of the polygon mirror 32*a* are different in angle, by an amount within a preset range of manufacture tolerance. Therefore, even if the rotational beam deflector 33 rotates at a constant velocity, the multiple deflective surfaces of the polygon mirror are different in the timing with which the beam of light is entered into the BD sensor 14. Therefore, in the case of the polygon mirror with four reflective surfaces, the beam of light is repeatedly detected with four different intervals (t1, t2, t3, and t4), as is evident from FIG. 5(B), which shows the waveform of the output of the BD sensor 14. In this embodiment, therefore, the length of these intervals are detected utilizing the clock of the CPU, although they may be detected using other means. Incidentally, the amounts of intervals shown in FIG. 5(B) are exaggerated in length for clarity in description.

In a case where the vibration sensor 9 in the first embodiment descried above is not employed, the difference in length among these intervals (which hereafter may be referred to as BD cycle) is used to reduce in amplitude the vibration (optical facet angle error) of the reflective member 36 (light beam directing mirror). FIGS. 6(A) and 6(B) are drawings which describe the adjustment of the BE) cycle, and the reduction in amplitude of the vibration.

Figure 6:
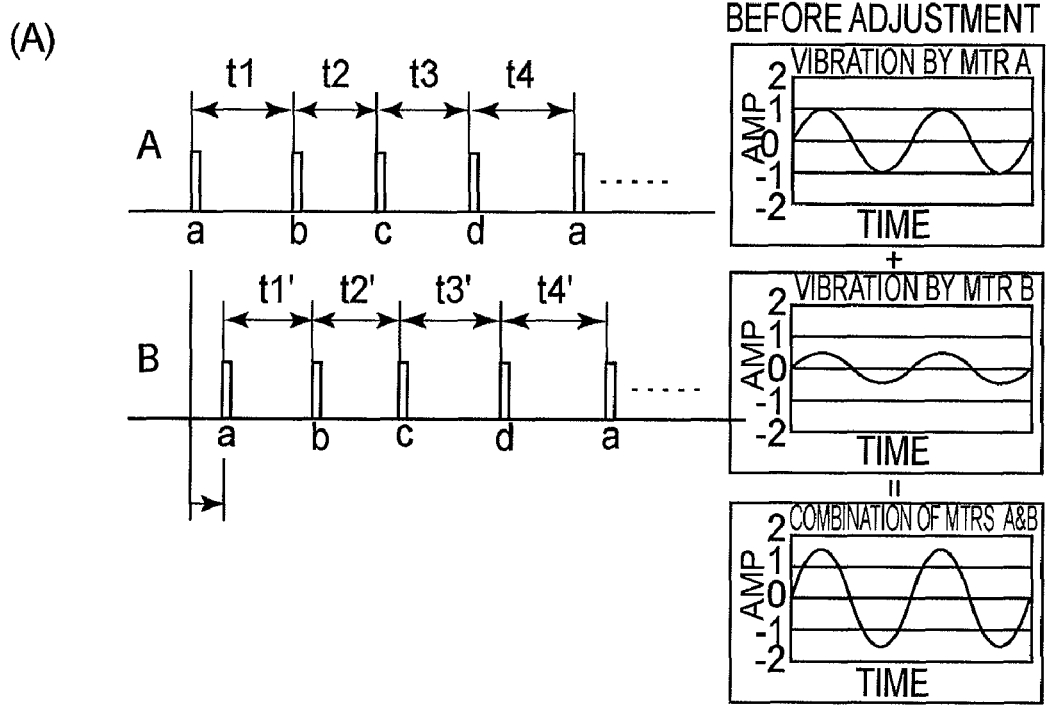
FIG. 6 is a schematic drawing which describes the adjustment of the BD cycle, and the reduction in the vibration resulting from the adjustment, in another embodiment of the present invention.
Figure 6:
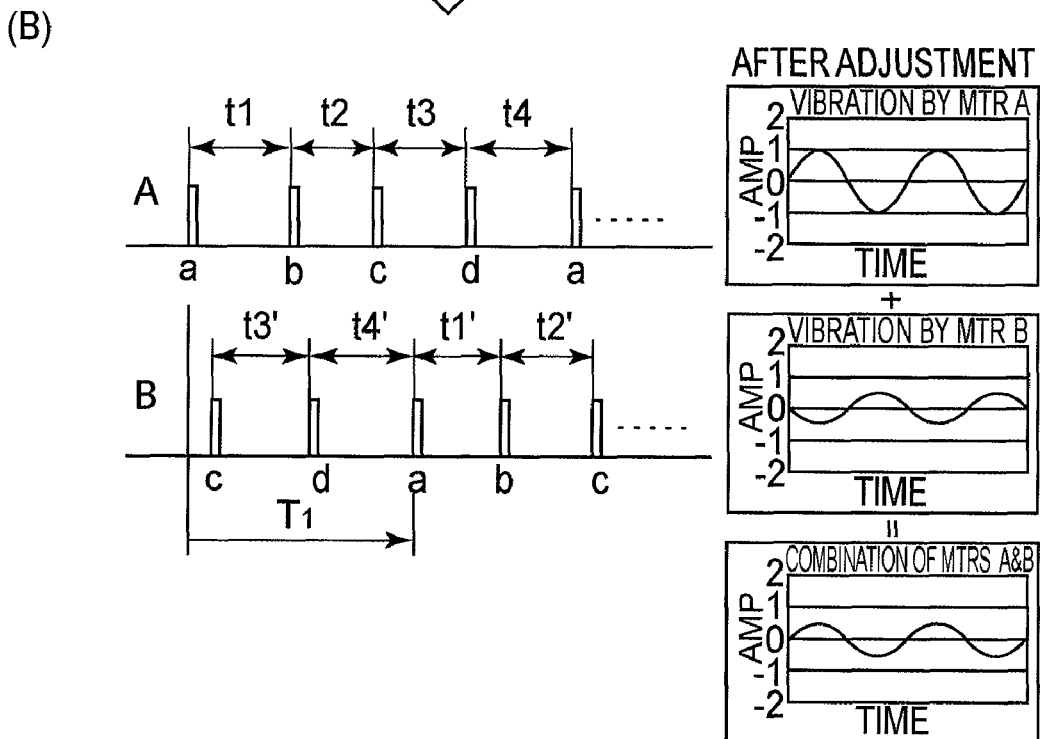

Referring to FIG. 6, the optical scanning apparatus in this embodiment is also designed so that the rotational beam deflector 33A (deflector A) and rotational beam deflector 33B (deflector B) can be independently started or stopped from each other. Therefore, each time the optical scanning apparatus is started, the relationship between the two rotational beam deflectors in terms of rotational phase is different from that when the optical scanning apparatus was started last time. Thus, the relationship among the BD cycles which was obtained when the relationship between the two deflector A and B is optimal, and the delay relative to the signals which the BD sensors 15 outputs as it detects the beam of light deflected onto the deflectors A and B, are stored as preset values in the storing means, that is, memory (ROM), in the image forming apparatus, so that each time the optical scanning apparatus is started, the deflectors A and B can be controlled so that their relationship in terms of rotational phase satisfies the preset condition (preset values in memory), in order to minimize (prevent) the vibration of the mirror 36 in amplitude.

For example, if the deflectors A and B are started up while their rotational phases and vibrations are as shown in FIG.

6(A), the following data are stored in the memory (ROM) in the image forming apparatus: t1, t2, t3, and t4, and t1', t2', t3', and t4', which are the data of the BD cycle relative to the polygon mirror 32a (32aA, 32aB). Further, the optimal length of delay T1 (FIG. 6(B)) between the two deflectors is stored in advance in the memory. Then, each time the deflectors A and B are started up for image formation, the relationship between the two deflectors A and B in terms of rotational phase is determined from the output signals of the BD sensor 14. Then, the deflectors are controlled in rotational phase so that the relationship between the two deflectors satisfies the preset condition (values stored in the memory (ROM)). That is, the adjustment for realizing the preset relationship among the multiple rotational beam deflectors in terms of rotational phase must be carried out each time the rotational beam deflectors are started. For example, the relationship between the two deflectors in terms of rotational phase can be adjusted by controlling (accelerating and decreasing only one motor, for example, by a preset amount) so that the BD cycle matches the preset, in order to reduce in amplitude the vibration of the light beam deflecting mirror 36b.

Figure 12:
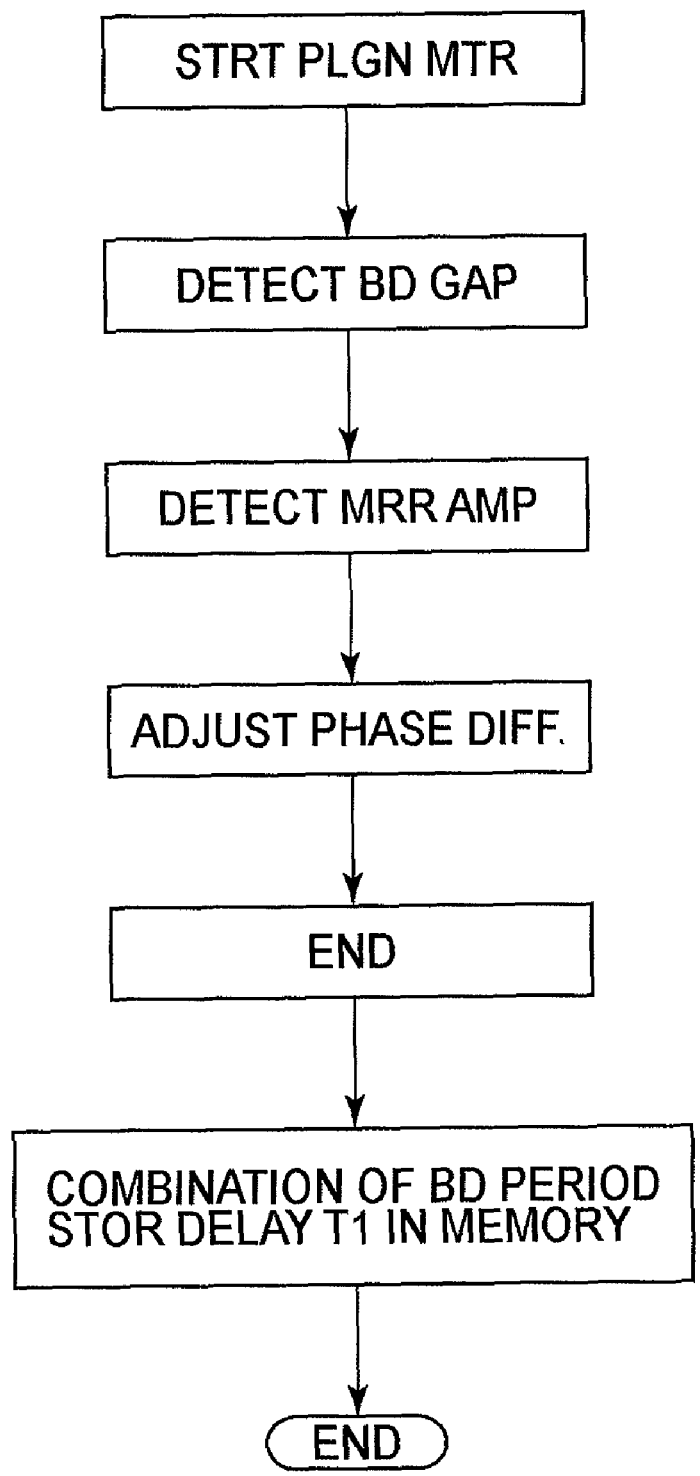
FIG. 12 is a flowchart of the operations for setting the phase difference adjusting data before shipping.
Figure 13:
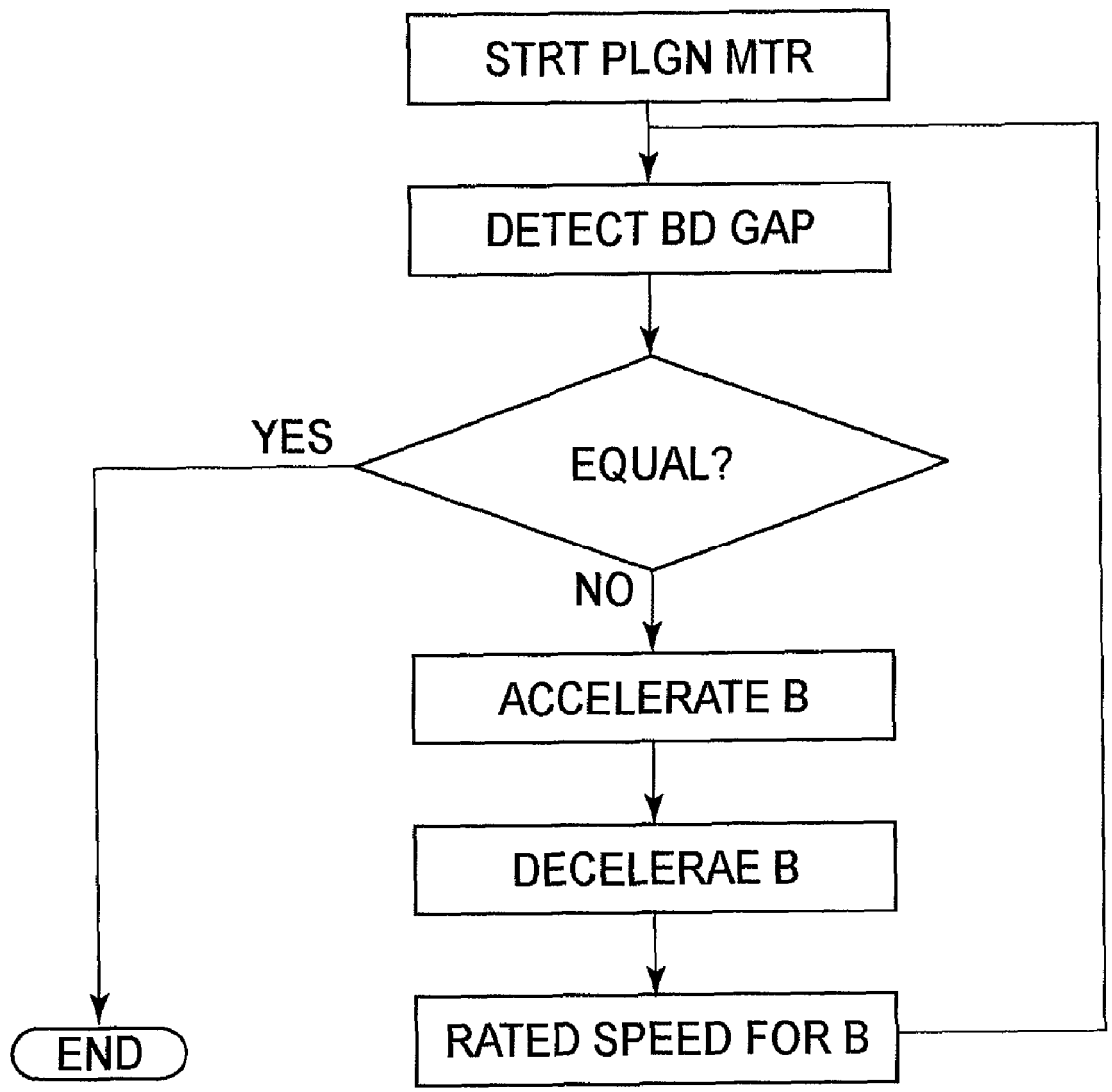
FIG. 13 is a flowchart of the operations in the image forming apparatus.

FIG. 12 is a flowchart of the operational sequence for setting the phase difference adjustment data, in a factory. FIG. 13 is a flowchart of the control sequence for adjusting the relationship in rotational phase between the deflectors A and B. Referring to FIG. 12, when an assembled optical scanning apparatus is adjusted in a factory, the BD cycle data for each deflector is stored in the memory, in order to make it possible to detect the position (angle) of the reflective surfaces from the BD signals. Further, the length of the delay which made the polygon mirror smallest in optical facet angle error is stored in the memory before the optical scanning apparatus is shipped out of the factory. More specifically, one of the reflective surfaces of the polygon mirror is selected as the referential surface, and the length of delay of each reflective surface relative to the referential surface is stored in the memory. Then, as the optical scanning apparatus motor is started up in an image forming apparatus, the relationship between its two rotational deflectors in terms of rotational phase is changed by temporarily accelerating and decelerating one of the motors (or both), while comparing the amount of the rotational phase difference, with the values stored in the memory, until the amount matches the stored data. The method in this embodiment is not a method which compares the vibration in amplitude to determine the direction in which the relationship between the two deflectors is changed in rotational phase, as the method in the first embodiment does. Therefore, the rotational phase of the rotational beam deflector B is changed by shifting its rotational phase in either the direction in which it is accelerated or decelerated.

Further, the ideal amount of the difference in rotational phase between the two rotational beam deflectors may be set while evaluating the images which the image forming apparatus outputs.

For example:

(1) An image is outputted with the amount of difference in rotational phase between the two deflectors set to each of various values, and the value corresponding to the best image is selected as the preset value for the rotational phase difference.

To described more concretely, a halftone image, that is, an image usable to evaluate an image forming apparatus in image quality, is printed with the rotational phase difference set at different values, and the outputted images are evaluated with naked eyes. Then, the value corresponding to the image, the optical facet angle error which is least conspicuous is stored as a target value. For example, if the halftone image is outputted while varying the amount of difference in rotational by 30 degrees, the maximum number of sheets of paper necessary to determine the optimal value for the difference in rotational phase is only 12. Needless to say, operating the image forming apparatus in the two-sided mode, 6 sheets of paper will suffice.

(2) Including the value to which the amount of difference in rotational phase is set when forming each halftone image, as a part of the halftone image, makes it easier switch the target value stored in the memory. That is, the amount of difference in rotational phase between the two rotational beam deflectors can be easily readjusted based on the evaluation of the images outputted by the image forming apparatus.

To described more concretely, the image forming apparatus is programmed so that each time a test image (halftone image) is printed, the value to which the amount of the difference in rotational phase has been set to form the test image, is printed on the sheet of paper on which the image is formed. Then, a user or a factory worker is to choose the image with the best quality among the multiples images made, and then, to input the value corresponding to the best image into the image forming apparatus so that the amount of difference in rotational phase can be set to the value corresponding to the best image.

(3) In a case where the mirrors 36 (36a, 36b, 36c, and 36d) are different in the optimal relationship in rotational phase between the two rotational beam deflectors for minimizing the vibrations in amplitude, the value corresponding to the amount of difference in rotational phase, which minimizes the sum of the amplitudes of the vibrations of the mirrors 36 may be used as the target value.

To describe more concretely, in a case where the primary colors are different in the optimal amount of difference in rotational phase between the two rotational beam deflectors, that is, the amount of difference in rotational phase for minimizing the amount of optical facet angle error, it is impossible to set the image forming apparatus so that all of the four monochromatic images, different in color, will be formed with the highest level of quality. In such a case, the vibration is measured at the location of each of the mirrors provided for different colors, one for one. Then, a value corresponding to the amount of difference in rotational phase which makes smallest the sum of the measured vibrations in terms of amplitude is used as the target value for the rotational phase difference, in order to form an image with the image forming apparatus set so that the sum of the vibrations is smallest in amplitude.

(4) The color in which each of four monochromatic image is formed affects the amount of effect which the vibration has on the level of quality at which an image is formed. Thus, the relationship between the two rotational beam deflectors in terms of rotational phase may be set in consideration of the amount of effects which each primary color has. For example, the following is the formula for calculating the sum M of the amplitudes of the vibrations of the mirrors, which takes the amount of the optical facet angle error for each primary color (Vbk, Vc, Vm, and Vy) and the amount of effects which each primary color has, into consideration. The smallest value of M obtained by this formula is to be used as the target value.

Generally, an image defect attributable to the vibration of the component(s) of the optical scanning apparatus for exposing the photosensitive drum, corresponding to a primary color, such as yellow, which is high in lightness, is less conspicuous than an image defect corresponding to the other colors, for example, black color; an image defect attributable to the vibration of the component(s) of the optical scanning apparatus, which corresponds to black color, is significantly more conspicuous. Therefore, the target value for the amount of difference in rotational phase may be selected so that the vibration of the component(s) of the rotational beam deflector for forming an electrostatic image for the yellow monochromatic image, becomes greater in amplitude than the vibrations of the component(s) of the deflector for the monochromatic images of other colors. In other words, the amount of difference in rotational phase is set so that the optical member placed in the path of the beam of light of the primary color which is lower in lightness becomes smaller in the amplitude of vibration than the optical member placed in the path of the beams of light of a color which is higher in lightness.

To describe more concretely, as described above, in a case where multiple rotational beam deflectors for forming latent images for monochromatic images different in color, one for one, are different in a value to which the amount of difference in rotational phase is to be set to minimize the amount of optical facet angle error, there is no value to which the amount of difference in rotational phase can be set to form all monochromatic images at their highest level of quality. Thus, in consideration of the level of conspicuousness of image defect, which is affected by the level of lightness of the defect, factors, such as abk=1, ac=0.8, am=0.8, ay=0.2, which represents the level of conspicuousness, are employed to set the target value. Then, when an optical scanning apparatus is adjusted in a factory, a value which makes smallest the total of the amount of optical facet angle error multiplied by the abovementioned factors is set as the target value. With the employment of such a method, the image forming apparatus outputs an image under the condition under which it can form an image which appears best.

In the above, the second embodiment of the present invention was described with reference to the case in which the light beam deflecting mirror, that is, the reflective member, disposed to deflect a beam of light onto the peripheral surface of the photosensitive drum were vibration. However, the present invention is also applicable to electrophotographic image forming apparatuses in which their optical members other than the reflective members, for example, focusing lenses, for example, f-? lenses 34 and 34, which are sensitive to vibrations, and therefore, are more likely to cause the optical facet angle error, vibrate. The results of such applications are the same as those obtained by the image forming apparatus in this embodiment.

This embodiment can achieve the same effects as those achieved by the first embodiment. That is, the image forming apparatus in this embodiment, which uses multiple (two) rotational beam deflectors to form an image, is structured to control the amount of difference in rotational phase between the rotational beam deflectors in order to prevent (minimize) the vibration of the reflective members in amplitude. Therefore, it is capable of minimizing the amount of the optical facet angle error of the image forming apparatus, making it thereby for the image forming apparatus to form an image which is significantly higher in quality than an image formable by an image forming apparatus in accordance with the prior art.

Further, according to the structural arrangement of the an image forming apparatus in this embodiment, the beam of light emitted from the optical scanning apparatus can be reduced in positional deviation, in order to form an image which is significantly higher in image quality than an image formable by an image forming apparatus in accordance with the prior art, without being limited in terms of the location to which the optical box is to be attached to cancel the vibration mode of the optical box, and also without employing a component, such as en electric motor, dedicated to the cancellation of the vibration.

The first and second embodiments were described with reference to the image forming apparatuses having two rotational beam deflectors. However, the number of the rotational beam deflectors does not need to be two. That is, the present invention is also applicable to image forming apparatuses having three or more rotational beam deflectors.

Further the first and second embodiments were described above with reference to the image forming apparatuses having multiple photosensitive drums as image bearing members. However, the present invention is also applicable to image forming apparatus having only a single photosensitive drum, and multiple rotational beam deflectors which expose the photosensitive drum. The effects obtainable by applying the present invention to such image forming apparatuses are the same as those obtained by the image forming apparatuses in the first and second embodiments.

Further, what are required of an image forming apparatus regarding the positioning of the optical components of its optical scanning apparatus, and its internal structure, in order for the present invention to be applicable to the image forming apparatus, do not need to be the same as those of the image forming apparatuses in the first and second embodiments.

Further, in the preceding embodiments, the multiple (two) rotational beam deflectors were attached to the same housing. However, it is not necessary that all rotational beam deflectors are placed in a single optical box. That is, the present invention is also applicable to any optical scanning apparatus which is practically the same in structure as those in the preceding embodiments, for example, an image forming apparatus which has multiple rotational beam deflectors, and multiple optical boxes in which the multiple rotational beam deflectors are placed, one for one, as shown in FIG. 7, as long as the multiple optical boxes are integral parts of a large structure through which vibration transmits.

Figure 7:
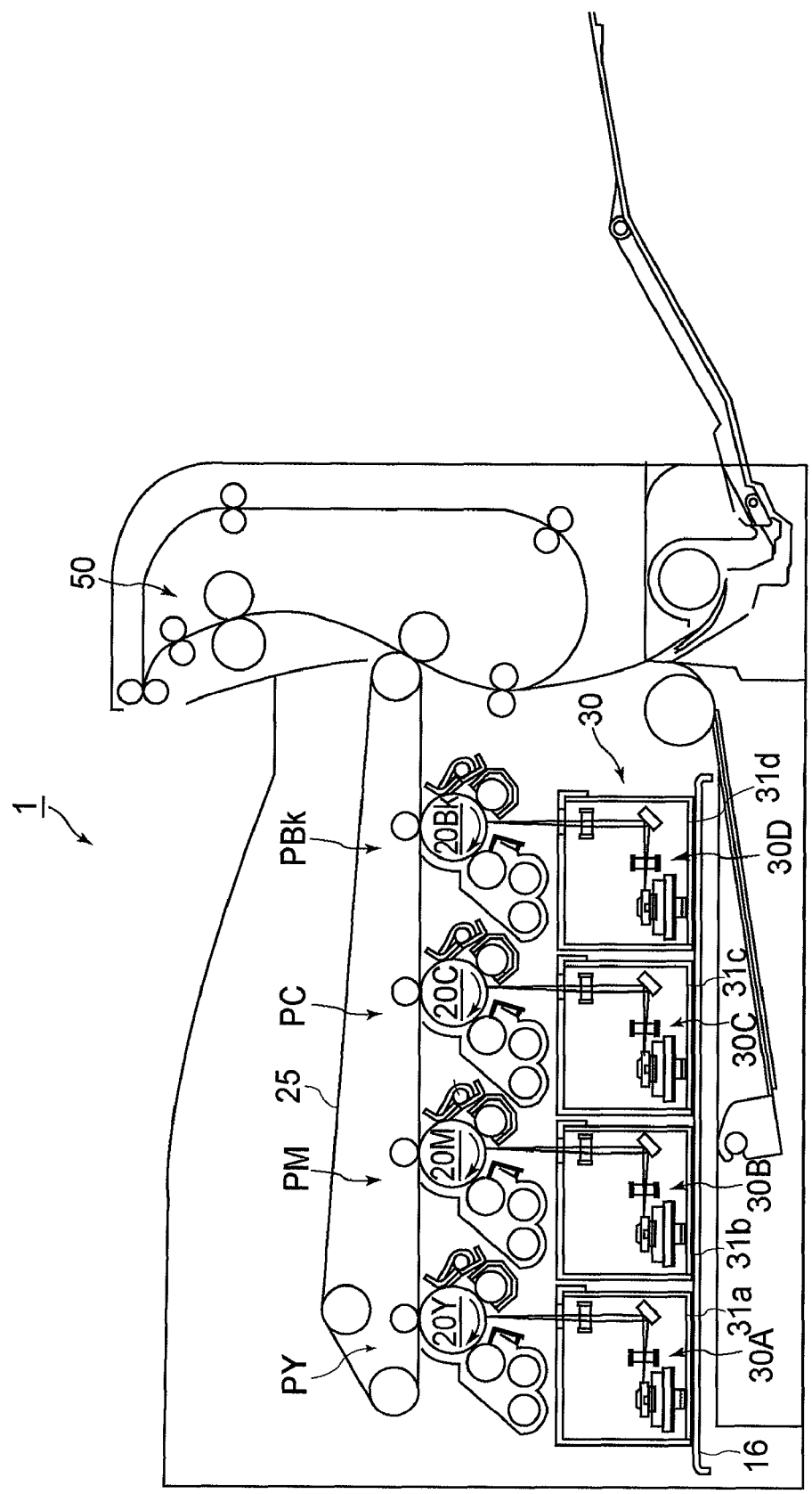
FIG. 7 is a schematic sectional view of the image forming apparatus in another embodiment of the present invention, showing the structure of the apparatus.

More specifically, the image forming apparatus shown in FIG. 7 has four photosensitive drums 20 (20Y, 20M, 20C, and 20Bk), and four optical scanning apparatuses 30 (30Y, 30M, 30C, and 30Bk) which correspond to the four photosensitive drums, respectively. Further, the optical scanning apparatuses 30 (30Y, 30M, 30C, and 30Bk) are provided with optical boxes 31 (31Y, 31M, 31C, and 31Bk), respectively. However, the optical boxes 31 (31Y, 31M, 31C, and 31Bk) are attached to a common optical stay 16 by their bottom walls. This structural arrangement is considered to be the same as the structural arrangement in which multiple rotational beam deflectors are amounted in a single box. In other words, the present invention is also applicable to an image forming apparatus, such as the one shown in FIG. 7, and the application of the present invention to such an image forming apparatus can achieve the same effects as those achieved by the image forming apparatuses in the preceding embodiments.

Further, the number of photosensitive drums of an image forming apparatus does not need to be four. That is, the present invention is any electrophotographic image forming apparatus, as long as the image forming apparatus has two or more photosensitive drums which are exposed with the use of two or more rotational beam deflectors. Obviously, the application of the present invention to such an image forming apparatus can achieve the same effects as those achieved by the image forming apparatuses in the preceding embodiments.

According to the present invention, an image forming apparatus which uses multiple rotational beam deflectors to form an image can be improved in terms of optical facet angle error, without employing a special component, such as an electric motor, dedicated to the cancellation of vibration, and also, without reducing the image forming apparatus in the latitude with which the components of its optical scanning apparatus can be positioned.

Also according to the present invention, an image forming apparatus which uses multiple rotational beam deflectors to form an image can be improved in terms of image quality by improving it in terms of optical facet angle error by controlling the amount of difference in rotational face among its rotational beam deflectors.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Application No. 038217/2007 filed Feb. 19, 2007, which is hereby incorporated by reference.

What is claimed is:

1. A scanning optical apparatus comprising:
a first rotatable polygonal mirror driven to deflect a first laser beam emitted from a first light source such that the first laser beam scans a first member to be scanned;
a second rotatable polygonal mirror driven to deflect a second laser beam emitted from a second light source such that the second laser beam scans a second member to be scanned;
a plurality of optical members configured to guide the first laser beam to the first member to be scanned and to guide the second laser beam to the second member to be scanned;
a housing on which the first rotatable polygonal mirror, the second rotatable polygonal mirror, and the plurality of optical members are disposed;
a vibration detecting unit configured to detect vibration of at least one of the optical members while the first rotatable polygonal mirror and the second rotatable polygonal mirror are driven; and
a phase control unit configured to control a phase relation between the first rotatable polygonal mirror and the second rotatable polygonal mirror on the basis of an output of the vibration detecting unit such that the vibration of the optical member detected by the vibration detecting unit is reduced.

2. An apparatus according to claim 1, wherein the phase control unit controls rotations of at least one of the first rotatable polygonal mirror and the second rotatable polygonal mirror to minimize the vibration of a predetermined one of optical members on the basis of an output of the vibration detecting unit.

3. An apparatus according to claim 1, wherein the phase control unit controls rotations of at least one of the first rotatable polygonal mirror and the second rotatable polygonal mirror to minimize a total of amounts of vibration of the plurality of optical members on the basis of an output of the vibration detecting unit.

4. An apparatus according to claim 1, wherein the optical member includes an imaging lens or a reflection member.

5. An apparatus according to claim 1, wherein the vibration detecting unit detects the vibration of the optical member disposed at a position of an antinode when the first rotatable polygonal mirror and the second rotatable polygonal mirror are driven.

6. An image forming apparatus comprising:
a first image bearing members on which an image is formed by toner;
a second image bearing member on which an image is formed by toner of which intensity is lower than that of the toner to form the image on the first image bearing member;
a first rotatable polygonal minor driven to deflect a first laser beam emitted from a first light source such that the first laser beam scans the first image bearing member;
a second rotatable polygonal mirror driven to deflect a second laser beam emitted from a second light source such that the second laser beam scans the second image bearing member;
a plurality of optical members configured to guide the first laser beam to the first image bearing member and to guide the second laser beam to second image bearing member;
a housing on which the first rotatable polygonal mirror, the second rotatable polygonal mirror, and the plurality of optical members are disposed;
a vibration detecting unit configured to detect vibration of at least one of the optical members while the first rotatable polygonal mirror and the second rotatable polygonal mirror are driven; and
a phase control unit configured to control a phase relation between the first rotatable polygonal mirror and the second rotatable polygonal mirror on the basis of an output of the vibration detecting unit so that the vibration of the optical member detected by the vibration detecting unit is reduced;
wherein the optical members include a first optical member disposed across an optical path of the second laser beam and a second optical member disposed across the optical path of the second laser beam, wherein the phase control unit controls the phase relation between the first rotatable polygonal mirror and the second rotatable polygonal mirror such that vibration amplitude of the first optical member is smaller than a vibration amplitude of the second optical member.

7. An apparatus according to claim 6, wherein the phase control unit controls rotation of at least one of the first rotatable polygonal mirror and the second rotatable polygonal mirror to minimize the vibration of a predetermined one of optical members on the basis of an output of the vibration detecting unit.

8. An apparatus according to claim 6, wherein the phase control unit controls rotation of at least one of the first rotatable polygonal mirror and the second rotatable polygonal mirror to minimize a total of amounts of the vibration of the plurality of optical members on the basis of an output of the vibration detecting unit.

9. An apparatus according to claim 6, wherein the vibration detecting unit detects the vibration of the optical member disposed at a position of an antinode when the first rotatable polygonal mirror and the second rotatable polygonal mirror are driven.

* * * * *